United States Patent
Wu et al.

(10) Patent No.: US 12,348,373 B2
(45) Date of Patent: Jul. 1, 2025

(54) COMMUNICATION METHOD, APPARATUS, AND SYSTEM

(71) Applicant: HUAWEI TECHNOLOGIES CO., LTD., Shenzhen (CN)

(72) Inventors: Yizhuang Wu, Beijing (CN); Yongcui Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 677 days.

(21) Appl. No.: 17/695,127

(22) Filed: Mar. 15, 2022

(65) Prior Publication Data
US 2022/0210700 A1 Jun. 30, 2022

Related U.S. Application Data

(63) Continuation of application No. PCT/CN2019/106001, filed on Sep. 16, 2019.

(51) Int. Cl.
*H04W 28/08* (2023.01)
*H04L 41/0894* (2022.01)

(52) U.S. Cl.
CPC ..... *H04L 41/0894* (2022.05); *H04W 28/0925* (2020.05)

(58) Field of Classification Search
CPC .................................. H04W 28/0925
See application file for complete search history.

(56) References Cited

U.S. PATENT DOCUMENTS

| 2016/0344565 A1 | 11/2016 | Batz et al. |
| 2017/0289278 A1 | 10/2017 | Rasanen |
| 2017/0317936 A1 | 11/2017 | Swaminathan et al. |
| 2018/0192471 A1* | 7/2018 | Li .......................... H04W 4/60 |

FOREIGN PATENT DOCUMENTS

| CN | 104811326 A | 7/2015 |
| CN | 105812272 A | 7/2016 |
| CN | 106411768 A | 2/2017 |
| CN | 106533935 A | 3/2017 |

(Continued)

OTHER PUBLICATIONS

Intel, ATandT, New solution: NWDAF Influence on traffic routing. 3GPP TSG SA WG2 Meeting #127, Apr. 16-20, 2018, Sanya, China. S2-183298, 4 pages.

(Continued)

*Primary Examiner* — Samina F Choudhry
(74) *Attorney, Agent, or Firm* — HAUPTMAN HAM, LLP

(57) ABSTRACT

A communication method includes receiving, by a policy control network element executed by a processor, first information. The first information is service information or a traffic steering requirement. The traffic steering requirement includes at least one service function. The communication method also includes obtaining, by the policy control network element, first traffic steering policy information from a first network element based on the first information. The first traffic steering policy information indicates network elements corresponding to the at least one service function and a sequence in which service data passes through the network elements corresponding to the at least one service function.

13 Claims, 15 Drawing Sheets

(56) References Cited

FOREIGN PATENT DOCUMENTS

| CN | 107113799 A | 8/2017 | | |
|----|----|----|----|----|
| WO | 2016109970 A1 | 7/2016 | | |
| WO | WO-2017212318 A1 | * | 12/2017 | ............. H04L 12/14 |

OTHER PUBLICATIONS

Extended European Search Report issued in corresponding European Application No. 19945885.2, dated Jul. 14, 2022, pp. 1-9.

Huawei, HiSilicon, TS 23.501: Roaming scenario in PCC. SA WG2 Meeting #122Bis, Aug. 21-25, 2017, Sophia Antipolis, France, S2-176188, 15 pages.

Huawei, HiSilicon, Replacing references to TS 23.203 with text for clauses 6.1.3.6 to 6.1.3.18. 3GPP TSG-SA WG2 Meeting #132, Xi an, China, Apr. 8-Apr. 12, 2019, S2-1903466, 8 pages.

International Search Report issued in corresponding International Application No. PCT/CN2019/106001, dated May 26. 2020, pp. 1-27.

Huawei, HiSilicon, TS 23.501: Roaming scenario in PCC. SA WG2 Meeting #122Bis, Aug. 21-25, 2017, Sophia Antipolis, France, S2-175616, 15 pages.

Chinese Office Action issued in corresponding Chinese Application No. 201980099876.7, dated Aug. 1, 2022, pp. 1-9.

* cited by examiner

COMMUNICATION METHOD, APPARATUS, AND SYSTEM

CROSS-REFERENCE TO RELATED APPLICATIONS

This application is a continuation of International Patent Application No. PCT/CN2019/106001, filed on Sep. 16, 2019, the disclosure of which is hereby incorporated by reference in its entirety.

TECHNICAL FIELD

This application relates to the field of mobile communication technologies, and in particular, to a communication method, apparatus, and system.

BACKGROUND

Traffic steering control is introduced to provide better value-added services for users. In a 5th generation (5G) network, the traffic steering control includes triggering, by a policy control network element, to activate a specific N6 traffic steering policy to steer services of a user to an appropriate N6 service function.

In the current technology, traffic steering policy information is preconfigured in a core network node, and when a service occurs, the policy control network element determines to activate the traffic steering control for the specific service. This method belongs to a static management method, and is not flexible enough.

SUMMARY

This application provides a communication method, apparatus, and system, to dynamically configure a traffic steering policy.

According to a first aspect, this application provides a communication method. The method includes: A policy control network element receives first information, where the first information is service information or a traffic steering requirement, and the traffic steering requirement includes at least one service function. The policy control network element obtains first traffic steering policy information from a first network element based on the first information, where the first traffic steering policy information includes at least one piece of traffic steering policy information, and the traffic steering policy information is used to indicate network elements corresponding to the at least one service function and a sequence in which service data passes through the network elements corresponding to the at least one service function. Based on the foregoing solution, the policy control network element can dynamically obtain the corresponding traffic steering policy information from the first network element based on the first information, thereby dynamically configuring a traffic steering policy.

In a possible implementation method, the first information is the traffic steering requirement. That the policy control network element obtains first traffic steering policy information from a first network element based on the first information includes: The policy control network element sends the traffic steering requirement to the first network element; and the policy control network element receives, from the first network element, the first traffic steering policy information corresponding to the traffic steering requirement.

In a possible implementation method, the first information is the service information. That the policy control network element obtains first traffic steering policy information from a first network element based on the first information includes: The policy control network element determines the traffic steering requirement based on the service information; the policy control network element sends the traffic steering requirement to the first network element; and the policy control network element receives, from the first network element, the first traffic steering policy information corresponding to the traffic steering requirement.

In a possible implementation method, the policy control network element receives location information corresponding to a service. That the policy control network element sends the traffic steering requirement to the first network element includes: The policy control network element sends the traffic steering requirement and the location information corresponding to the service to the first network element. That the policy control network element receives, from the first network element, the first traffic steering policy information corresponding to the traffic steering requirement includes: The policy control network element receives, from the first network element, the first traffic steering policy information corresponding to the location information and the traffic steering requirement.

In a possible implementation method, the policy control network element receives location information corresponding to a service. The policy control network element determines second traffic steering policy information based on the first traffic steering policy information and the location information corresponding to the service, where the second traffic steering policy information includes location information corresponding to the second traffic steering policy information. The policy control network element sends the second traffic steering policy information to a session management network element.

In a possible implementation method, the policy control network element sends the first traffic steering policy information or a traffic steering identifier corresponding to the first traffic steering policy information to a session management network element.

In a possible implementation method, the policy control network element determines third traffic steering policy information based on the first information and the first traffic steering policy information.

In a possible implementation method, the policy control network element receives location information corresponding to a service. That the policy control network element determines third traffic steering policy information based on the first information and the first traffic steering policy information includes: The policy control network element determines the third traffic steering policy information based on the first information, the first traffic steering policy information, and the location information corresponding to the service, where the third traffic steering policy information includes location information corresponding to the third traffic steering policy information. The policy control network element sends the third traffic steering policy information to a session management network element.

In a possible implementation method, the location information corresponding to the service is location information of a terminal device.

In a possible implementation method, the location information corresponding to the service is location information of service deployment, location information of a server that provides the service, or location information of a user plane that accesses the service.

According to a second aspect, this application provides a communication method. The method includes: A policy control network element receives a first message, where the first message includes first information, the first information is service information or a traffic steering requirement, and the traffic steering requirement includes at least one service function. The policy control network element obtains first traffic steering policy information from a first network element based on the first message, where the first traffic steering policy information includes at least one piece of traffic steering policy information, and the traffic steering policy information is used to indicate network elements corresponding to the at least one service function and a sequence in which service data passes through the network elements corresponding to the at least one service function. The policy control network element determines second traffic steering policy information based on the first information and the first traffic steering policy information. Based on the foregoing solution, the policy control network element can dynamically obtain the corresponding traffic steering policy information from the first network element based on the first message, thereby dynamically configuring a traffic steering policy.

In a possible implementation method, the policy control network element receives location information corresponding to a service. That the policy control network element obtains first traffic steering policy information from a first network element based on the first message includes: The policy control network element obtains the first traffic steering policy information from the first network element based on the first message and the location information corresponding to the service.

In a possible implementation method, the first traffic steering policy information further includes location information corresponding to the first traffic steering policy information. The method further includes: The policy control network element receives location information corresponding to a service. That the policy control network element determines second traffic steering policy information based on the first information and the first traffic steering policy information includes: The policy control network element determines the second traffic steering policy information based on the first information, the location information corresponding to the service, and the first traffic steering policy information.

In a possible implementation method, the policy control network element sends the second traffic steering policy information to a session management network element. Alternatively, the policy control network element sends the second traffic steering policy information and location information corresponding to the second traffic steering policy information to a session management network element.

In a possible implementation method, the policy control network element sends a traffic steering identifier corresponding to the second traffic steering policy information to a session management network element. Alternatively, the policy control network element sends a traffic steering identifier and location information corresponding to the second traffic steering policy information to a session management network element.

In a possible implementation method, the policy control network element allocates the traffic steering identifier corresponding to the second traffic steering policy information. Alternatively, the policy control network element receives, from the first network element, the traffic steering identifier corresponding to the second service policy information.

In a possible implementation method, the location information corresponding to the service is location information of a terminal device.

In a possible implementation method, the location information corresponding to the service is location information of service deployment, location information of a server that provides the service, or location information of a user plane that accesses the service.

According to a third aspect, this application provides a communication method. The method includes: A first policy control network element receives a traffic steering identifier, where the traffic steering identifier is used to indicate first traffic steering policy information, the first traffic steering policy information includes at least one piece of traffic steering policy information, and the traffic steering policy information is used to indicate network elements corresponding to at least one service function and a sequence in which service data passes through the network elements corresponding to the at least one service function. The first policy control network element sends the traffic steering identifier or the first traffic steering policy information to a session management network element, where the traffic steering identifier is used to determine the first traffic steering policy information. Based on the foregoing solution, the policy control network element may send the traffic steering identifier or the first traffic steering policy information corresponding to the traffic steering identifier to the session management network element based on the traffic steering identifier, thereby dynamically configuring a traffic steering policy.

In a possible implementation method, a second policy control network element receives first information, where the first information is service information or a traffic steering requirement, and the traffic steering requirement includes the at least one service function. The second policy control network element obtains traffic steering network element information from a first network element based on the first information, where the traffic steering network element information includes network elements corresponding to the at least one service function. The second policy control network element determines the first traffic steering policy information and/or the traffic steering identifier based on the traffic steering network element information. The second policy control network element sends the first traffic steering policy information and/or the traffic steering identifier to an application function network element.

In a possible implementation method, a second policy control network element receives first information, where the first information is service information or a traffic steering requirement, and the traffic steering requirement includes the at least one service function. The second policy control network element obtains traffic steering network element information from a first network element based on the first information, where the traffic steering network element information includes network elements corresponding to the at least one service function. The second policy control network element determines the first traffic steering policy information and/or the traffic steering identifier based on the traffic steering network element information and the first information. The second policy control network element sends the first traffic steering policy information and/or the traffic steering identifier to an application function network element.

In a possible implementation method, a second policy control network element receives a first message, where the first message includes first information, the first information is service information or a traffic steering requirement, and the traffic steering requirement includes the at least one service function. The second policy control network element obtains traffic steering network element information from a first network element based on the first message, where the traffic steering network element information includes network elements corresponding to the at least one service function. The second policy control network element determines the first traffic steering policy information and/or the traffic steering identifier based on the traffic steering network element information. The policy control network element sends the first traffic steering policy information and/or the traffic steering identifier to an application function network element.

In a possible implementation method, a second policy control network element receives first information, where the first information is service information or a traffic steering requirement, and the traffic steering requirement includes the at least one service function. The second policy control network element obtains second traffic steering policy information from a first network element based on the first information. The second policy control network element determines the first traffic steering policy information and/or the traffic steering identifier based on the second traffic steering policy information and the first information. The second policy control network element sends the first traffic steering policy information and/or the traffic steering identifier to an application function network element.

In a possible implementation method, a second policy control network element receives first information, where the first information is service information or a traffic steering requirement, and the traffic steering requirement includes the at least one service function. The second policy control network element obtains traffic steering policy information from a first network element based on the first information. The second policy control network element determines the first traffic steering policy information and/or the traffic steering identifier based on the traffic steering policy information. The second policy control network element sends the first traffic steering policy information and/or the traffic steering identifier to an application function network element.

In a possible implementation method, a second policy control network element receives a first message, where the first message includes first information, the first information is service information or a traffic steering requirement, and the traffic steering requirement includes the at least one service function. The second policy control network element obtains second traffic steering policy information from a first network element based on the first message. The second policy control network element determines the first traffic steering policy information and/or the traffic steering identifier based on the second traffic steering policy information and the first information. The second policy control network element sends the first traffic steering policy information and/or the traffic steering identifier to an application function network element.

In a possible implementation method, the second policy control network element sends the traffic steering identifier and/or the first traffic steering policy information to a data storage network element.

According to a fourth aspect, this application provides a communication method. The method includes: A policy control network element receives first information, where the first information is service information or a traffic steering requirement, and the traffic steering requirement includes at least one service function. The policy control network element obtains traffic steering network element information from a first network element based on the first information, where the traffic steering network element information includes network elements corresponding to the at least one service function. The policy control network element determines traffic steering policy information based on the traffic steering network element information, where the traffic steering policy information is used to indicate the network elements corresponding to the at least one service function and a sequence in which service data passes through the network elements corresponding to the at least one service function. Based on the foregoing solution, the policy control network element can dynamically obtain the corresponding traffic steering network element information from the first network element based on the first information, and determine the traffic steering policy information based on the traffic steering network element information, thereby dynamically configuring a traffic steering policy.

In a possible implementation method, the first information is the traffic steering requirement. That the policy control network element obtains the traffic steering network element information from the first network element based on the first information includes: The policy control network element sends the traffic steering requirement to the first network element; and the policy control network element receives, from the first network element, the traffic steering network element information corresponding to the traffic steering requirement.

In a possible implementation method, the first information is the service information. That the policy control network element obtains traffic steering network element information from a first network element based on the first information includes: The policy control network element determines the traffic steering requirement based on the service information; the policy control network element sends the traffic steering requirement to the first network element; and the policy control network element receives, from the first network element, the traffic steering network element information corresponding to the traffic steering requirement.

In a possible implementation method, the first information is the service information, and the first network element is an edge computing EC platform. That the policy control network element obtains traffic steering network element information from a first network element based on the first information includes: The policy control network element sends the service information to the EC platform; and the policy control network element receives, from the EC platform, the traffic steering network element information corresponding to the service information.

In a possible implementation method, the traffic steering network element information further includes location information of the network elements corresponding to the at least one service function. The method further includes: The policy control network element receives location information corresponding to a service. That the policy control network element determines traffic steering policy information based on the traffic steering network element information includes: The policy control network element determines the traffic steering policy information based on the traffic steering network element information and the location information corresponding to the service, where the traffic steering policy information includes location information corresponding to a traffic steering network element.

In a possible implementation method, the policy control network element receives location information corresponding to a service. That the policy control network element obtains traffic steering network element information from a first network element based on the first information includes:

The policy control network element obtains the traffic steering network element information from the first network element based on the first information and the location information corresponding to the service.

In a possible implementation method, the policy control network element sends the traffic steering policy information to a session management network element, where the traffic steering policy information is used to generate a forwarding rule.

In a possible implementation method, that the policy control network element determines traffic steering policy information based on the traffic steering network element information includes:

The policy control network element determines the traffic steering policy information based on the first information and the traffic steering network element information.

According to a fifth aspect, this application provides a communication method. The method includes: A session management network element obtains traffic steering policy information, where the traffic steering policy information includes location information, and the traffic steering policy information is used to indicate network elements corresponding to at least one service function and a sequence in which service data passes through the network elements corresponding to the at least one service function. The session management network element generates a forwarding rule based on the traffic steering policy information. The session management network element determines a user plane network element based on the location information. The session management network element sends the forwarding rule to the user plane network element.

In a possible implementation method, that a session management network element obtains traffic steering policy information includes: The session management network element receives, from a policy control network element, a traffic steering identifier corresponding to the traffic steering policy information; and the session management network element obtains the traffic steering policy information based on the traffic steering identifier.

In a possible implementation method, that the session management network element obtains the traffic steering policy information based on the traffic steering identifier includes: The session management network element locally obtains the traffic steering policy information based on the traffic steering identifier; or the session management network element obtains the traffic steering policy information from a capability exposure network element based on the traffic steering identifier.

In a possible implementation method, that a session management network element obtains traffic steering policy information includes: The session management network element obtains the traffic steering policy information from a policy control network element.

According to a sixth aspect, this application provides a communication apparatus. The apparatus may be a policy control network element, or may be a chip used in the policy control network element. The apparatus has a function of implementing the first aspect or each embodiment of the first aspect, the second aspect or each embodiment of the second aspect, the third aspect or each embodiment of the third aspect, or the fourth aspect or each embodiment of the fourth aspect. The function may be implemented by hardware, or may be implemented by hardware by executing corresponding software. The hardware or the software includes one or more modules corresponding to the function.

According to a seventh aspect, this application provides a communication apparatus. The apparatus may be a session management network element, or may be a chip used in the session management network element. The apparatus has a function for implementing the fifth aspect or each embodiment of the fifth aspect. The function may be implemented by hardware, or may be implemented by hardware by executing corresponding software. The hardware or the software includes one or more modules corresponding to the function.

According to an eighth aspect, this application provides a communication apparatus, including a processor and a memory. The memory is configured to store computer-executable instructions. When the apparatus runs, the processor executes the computer-executable instructions stored in the memory, to enable the apparatus to perform the method in the foregoing aspects or the embodiments of the foregoing aspects.

According to a ninth aspect, this application provides a communication apparatus, including a unit or means configured to perform the foregoing aspects or the steps in the foregoing aspects.

According to a tenth aspect, this application provides a communication apparatus, including a processor and an interface circuit. The processor is configured to: communicate with another apparatus through the interface circuit, and perform the methods in the foregoing aspects or the embodiments of the foregoing aspects. There are one or more processors.

According to an eleventh aspect, this application provides a communication apparatus, including a processor, configured to: be connected to a memory, and invoke a program stored in the memory, to perform the methods in the foregoing aspects or the embodiments of the foregoing aspects. The memory may be located inside the apparatus, or may be located outside the apparatus. In addition, there are one or more processors.

According to a twelfth aspect, this application further provides a computer-readable storage medium. The computer-readable storage medium stores instructions, and when the instructions are run on a computer, a processor is enabled to perform the methods in the foregoing aspects or the embodiments of the foregoing aspects.

According to a thirteenth aspect, this application further provides a computer program product including instructions. When the computer program product runs on a computer, the computer is enabled to perform the methods in the foregoing aspects or the embodiments of the foregoing aspects.

According to a fourteenth aspect, this application further provides a chip system, including a processor, configured to perform the methods in the foregoing aspects or the embodiments of the foregoing aspects.

According to a fifteenth aspect, this application further provides a communication system, including a policy control network element and a first network element. The policy control network element is configured to: receive first information, where the first information is service information or a traffic steering requirement, and the traffic steering requirement includes at least one service function; and obtain first traffic steering policy information from the first network element based on the first information, where the first traffic steering policy information includes at least one piece of traffic steering policy information, and the traffic steering policy information is used to indicate network elements corresponding to the at least one service function and a sequence in which service data passes through the network elements corresponding to the at least one service function.

The first network element is configured to send the first traffic steering policy information to the policy control network element.

According to a sixteenth aspect, this application further provides a communication system, including a policy control network element and a first network element. The policy control network element is configured to: receive a first message, where the first message includes first information, the first information is service information or a traffic steering requirement, and the traffic steering requirement includes at least one service function; obtain first traffic steering policy information from the first network element based on the first message, where the first traffic steering policy information includes at least one piece of traffic steering policy information, and the traffic steering policy information is used to indicate network elements corresponding to the at least one service function and a sequence in which service data passes through the network elements corresponding to the at least one service function; and determine second traffic steering policy information based on the first information and the first traffic steering policy information. The first network element is configured to send the first traffic steering policy information to the policy control network element.

According to a seventeenth aspect, this application further provides a communication system, including a first policy control network element and a session management network element. The first policy control network element is configured to: receive a traffic steering identifier from an application function network element, where the traffic steering identifier is used to indicate first traffic steering policy information, the first traffic steering policy information includes at least one piece of traffic steering policy information, and the traffic steering policy information is used to indicate network elements corresponding to at least one service function and a sequence in which service data passes through the network elements corresponding to the at least one service function; and send the traffic steering identifier or the first traffic steering policy information to the session management network element, where the traffic steering identifier is used to determine the first traffic steering policy information. The session management network element is configured to receive the traffic steering identifier or the first traffic steering policy information.

According to an eighteenth aspect, this application further provides a communication system, including a policy control network element and a first network element. The policy control network element is configured to: receive first information, where the first information is service information or a traffic steering requirement, and the traffic steering requirement includes at least one service function; obtain traffic steering network element information from the first network element based on the first information, where the traffic steering network element information includes network elements corresponding to the at least one service function; and determine traffic steering policy information based on the traffic steering network element information, where the traffic steering policy information is used to indicate the network elements corresponding to the at least one service function and a sequence in which service data passes through the network elements corresponding to the at least one service function. The first network element is configured to send the traffic steering network element information to the policy control network element.

DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figure 1A:
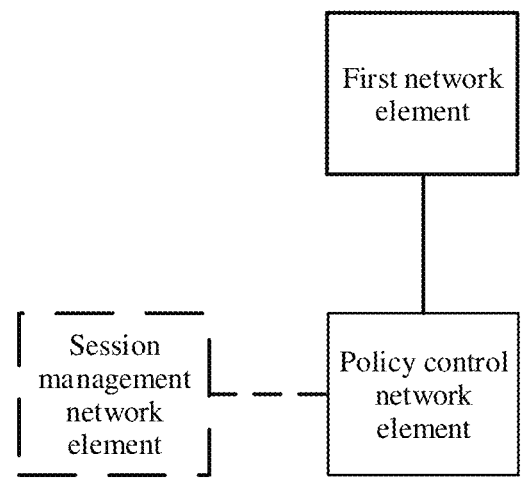
FIG. 1A is a schematic diagram of a communication system according to this application.

To resolve the problem mentioned in the background, as shown in FIG. 1A, this application provides a communication system. The system includes a policy control network element and a first network element. The first network element herein may be a data storage network element or an edge computing (EC) platform. The EC platform includes at least one control plane network element. The EC platform may be used to host a carrier service and a third-party service near an access point of a terminal device, so as to reduce an end-to-end delay and load of a transmission network, thereby ensuring effective service transmission. For example, the EC platform may be a multi-access edge computing (MEC) platform or another platform that supports application management (including functions such as application registration and application information configuration). Optionally, the system may further include a session management network element.

For the system in FIG. 1A, there are three solutions.
Solution 1:
The policy control network element is configured to: receive first information, where the first information is service information or a traffic steering requirement, and the traffic steering requirement includes at least one service function; and obtain first traffic steering policy information from the first network element based on the first information, where the first traffic steering policy information includes at least one piece of traffic steering policy information, and the traffic steering policy information is used to indicate network elements corresponding to the at least one service function and a sequence in which service data passes through the network elements corresponding to the at least one service function. The first network element is configured to send the first traffic steering policy information to the policy control network element.

In a possible implementation method, the first information is the traffic steering requirement. That the policy control network element is configured to obtain the first traffic steering policy information from the first network element based on the first information specifically includes: sending the traffic steering requirement to the first network element; and receiving, from the first network element, the first traffic steering policy information corresponding to the traffic steering requirement.

In a possible implementation method, the first information is the service information. That the policy control network element is configured to obtain the first traffic steering policy information from the first network element based on the first information specifically includes: determining the traffic steering requirement based on the service information; sending the traffic steering requirement to the first network element; and receiving, from the first network element, the first traffic steering policy information corresponding to the traffic steering requirement.

In a possible implementation method, the policy control network element is further configured to receive location information corresponding to a service. That the policy control network element is configured to send the traffic steering requirement to the first network element specifically includes: sending the traffic steering requirement and the location information corresponding to the service to the first network element. That the policy control network element is configured to receive, from the first network element, the first traffic steering policy information corresponding to the traffic steering requirement specifically includes: receiving, from the first network element, the first traffic steering policy information corresponding to the location information and the traffic steering requirement.

In a possible implementation method, the policy control network element is further configured to: receive location information corresponding to a service; determine second traffic steering policy information based on the first traffic steering policy information and the location information corresponding to the service, where the second traffic steering policy information includes location information corresponding to the second traffic steering policy information; and send the second traffic steering policy information to a session management network element.

In a possible implementation method, the policy control network element is further configured to send the first traffic steering policy information or a traffic steering identifier corresponding to the first traffic steering policy information to a session management network element, where the first traffic steering policy information is used to generate a forwarding rule.

In a possible implementation method, the first network element is further configured to receive the first traffic steering policy information from a network exposure network element.

In a possible implementation method, the policy control network element is further configured to determine third traffic steering policy information based on the first information and the first traffic steering policy information.

In a possible implementation method, the policy control network element is further configured to receive location information corresponding to a service. That the policy control network element is configured to determine the third traffic steering policy information based on the first information and the first traffic steering policy information specifically includes: determining the third traffic steering policy information based on the first information, the first traffic steering policy information, and the location information corresponding to the service, where the third traffic steering policy information includes location information corresponding to the third traffic steering policy information. The policy control network element is further configured to send the third traffic steering policy information to a session management network element.

In a possible implementation method, the location information corresponding to the service is location information of a terminal device.

In a possible implementation method, the location information corresponding to the service is location information of service deployment, location information of a server that provides the service, or location information of a user plane that accesses the service.

Solution 2:

The policy control network element is configured to: receive a first message, where the first message includes first information, the first information is service information or a traffic steering requirement, and the traffic steering requirement includes at least one service function; obtain first traffic steering policy information from the first network element based on the first message, where the first traffic steering policy information includes at least one piece of traffic steering policy information, and the traffic steering policy information is used to indicate network elements corresponding to the at least one service function and a sequence in which service data passes through the network elements corresponding to the at least one service function; and determine second traffic steering policy information based on the first information and the first traffic steering policy information. The first network element is configured to send the first traffic steering policy information to the policy control network element.

In a possible implementation method, the policy control network element is further configured to receive location information corresponding to a service. That the policy control network element is configured to obtain the first traffic steering policy information from the first network element based on the first message specifically includes: obtaining the first traffic steering policy information from the first network element based on the first message and the location information corresponding to the service.

In a possible implementation method, the first traffic steering policy information further includes location information corresponding to the first traffic steering policy information. The policy control network element is further configured to receive location information corresponding to a service. That the policy control network element is configured to determine the second traffic steering policy information based on the first information and the first traffic steering policy information specifically includes: determining the second traffic steering policy information based on the first information, the location information corresponding to the service, and the first traffic steering policy information.

In a possible implementation method, the policy control network element is further configured to send the second traffic steering policy information to a session management network element. Alternatively, the policy control network element is further configured to send the second traffic steering policy information and location information corresponding to the second traffic steering policy information to a session management network element.

In a possible implementation method, the policy control network element is further configured to: send a traffic steering identifier corresponding to the second traffic steering policy information to a session management network element; or send a traffic steering identifier and location information corresponding to the second traffic steering policy information to a session management network element.

In a possible implementation method, the policy control network element is further configured to: allocate the traffic steering identifier corresponding to the second traffic steering policy information; or receive the traffic steering identifier corresponding to the second service policy information from the first network element.

In a possible implementation method, the location information corresponding to the service is location information of a terminal device.

In a possible implementation method, the location information corresponding to the service is location information of service deployment, location information of a server that provides the service, or location information of a user plane that accesses the service.

Solution 3:

The policy control network element is configured to: receive first information, where the first information is service information or a traffic steering requirement, and the traffic steering requirement includes at least one service function; obtain traffic steering network element information from the first network element based on the first information, where the traffic steering network element information includes network elements corresponding to the at least one service function; and determine traffic steering policy information based on the traffic steering network element information, where the traffic steering policy information is used to indicate the network elements corresponding to the at least one service function and a sequence in which service data passes through the network elements corresponding to the at least one service function. The first network element is configured to send the traffic steering network element information to the policy control network element.

In a possible implementation method, the first information is the traffic steering requirement. That the policy control network element is configured to obtain the traffic steering network element information from the first network element based on the first information specifically includes: sending the traffic steering requirement to the first network element; and receiving, from the first network element, the traffic steering network element information corresponding to the traffic steering requirement.

In a possible implementation method, the first information is the service information. That the policy control network element is configured to obtain the traffic steering network element information from the first network element based on the first information specifically includes: determining the traffic steering requirement based on the service information; sending the traffic steering requirement to the first network element; and receiving, from the first network element, the traffic steering network element information corresponding to the traffic steering requirement.

In a possible implementation method, the first information is the service information, and the first network element is an EC platform. That the policy control network element is configured to obtain the traffic steering network element information from the first network element based on the first information specifically includes: sending the service information to the EC platform; and receiving, from the EC platform, the traffic steering network element information corresponding to the service information.

In a possible implementation method, the traffic steering network element information further includes location information of the network elements corresponding to the at least one service function. The policy control network element is further configured to receive location information corresponding to a service. That the policy control network element is configured to determine the traffic steering policy information based on the traffic steering network element information specifically includes: determining the traffic steering policy information based on the traffic steering network element information and the location information corresponding to the service, where the traffic steering policy information includes location information corresponding to a traffic steering network element.

In a possible implementation method, the policy control network element is further configured to receive location information corresponding to a service. That the policy control network element is configured to obtain the traffic steering network element information from the first network element based on the first information specifically includes: obtaining the traffic steering network element information from the first network element based on the first information and the location information corresponding to the service.

In a possible implementation method, the policy control network element is further configured to send the traffic steering policy information to a session management network element, where the traffic steering policy information is used to generate a forwarding rule. The session management network element is configured to receive the traffic steering policy information from the policy control network element.

In a possible implementation method, that the policy control network element is configured to determine the traffic steering policy information based on the traffic steering network element information specifically includes: determining the traffic steering policy information based on the first information and the traffic steering network element information.

Figure 1B:
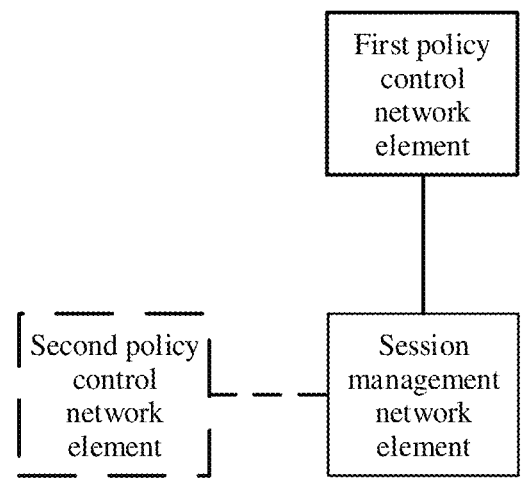
FIG. 1B is a schematic diagram of another communication system according to this application.

To resolve the problem mentioned in the background, as shown in FIG. 1B, this application provides another communication system. The system includes a first policy control network element and a session management network element. Optionally, the system may further include a second policy control network element.

In an embodiment, the first policy control network element is configured to: receive a traffic steering identifier from an application function network element, where the traffic steering identifier is used to indicate first traffic steering policy information, the first traffic steering policy information includes at least one piece of traffic steering policy information, and the traffic steering policy information is used to indicate network elements corresponding to at least one service function and a sequence in which service data passes through the network elements corresponding to the at least one service function; and send the traffic steering identifier or the first traffic steering policy information to the session management network element, where the traffic steering identifier is used to determine the first traffic steering policy information. The session management network element is configured to receive the traffic steering identifier or the first traffic steering policy information.

In a possible implementation method, the second policy control network element is configured to: receive first information from the application function network element, where the first information is service information or a traffic steering requirement, and the traffic steering requirement includes at least one service function; obtain traffic steering network element information from a first network element based on the first information, where the traffic steering network element information includes network elements corresponding to the at least one service function; determine the first traffic steering policy information and/or the traffic steering identifier based on the traffic steering network element information; and send the first traffic steering policy information and/or the traffic steering identifier to the application function network element.

In a possible implementation method, the second policy control network element is configured to: receive first information, where the first information is service information or a traffic steering requirement, and the traffic steering requirement includes at least one service function; obtain traffic steering network element information from a first network element based on the first information, where the traffic steering network element information includes network elements corresponding to the at least one service function; determine the first traffic steering policy information and/or the traffic steering identifier based on the traffic steering network element information and the first information; and send the first traffic steering policy information and/or the traffic steering identifier to the application function network element.

In a possible implementation method, the second policy control network element is configured to: receive a first message, where the first message includes first information, the first information is service information or a traffic steering requirement, and the traffic steering requirement includes at least one service function; obtain traffic steering network element information from a first network element based on the first message, where the traffic steering network element information includes network elements corresponding to the at least one service function; determine the first traffic steering policy information and/or the traffic steering identifier based on the traffic steering network element information; and send the first traffic steering policy information and/or the traffic steering identifier to the application function network element.

In a possible implementation method, the second policy control network element is configured to receive first information from an application function network element, where the first information is service information or a traffic steering requirement, and the traffic steering requirement includes at least one service function; obtain second traffic steering policy information from a first network element; determine the first traffic steering policy information and/or the traffic steering identifier based on the second traffic steering policy information and the first information; and send the first traffic steering policy information and/or the traffic steering identifier to the application function network element.

In a possible implementation method, the second policy control network element is configured to receive first information, where the first information is service information or a traffic steering requirement, and the traffic steering requirement includes at least one service function; obtain traffic steering policy information from a first network element based on the first information; determine the first traffic steering policy information and/or the traffic steering identifier based on the traffic steering policy information; and send the first traffic steering policy information and/or the traffic steering identifier to the application function network element.

In a possible implementation method, the second policy control network element is configured to receive a first message, where the first message includes first information, the first information is service information or a traffic steering requirement, and the traffic steering requirement includes at least one service function; obtain second traffic steering policy information from a first network element based on the first message; determine the first traffic steering policy information and/or the traffic steering identifier based on the second traffic steering policy information and the first information; and send the first traffic steering policy information and/or the traffic steering identifier to the application function network element.

In a possible implementation method, the second policy control network element is further configured to send the traffic steering identifier and/or the first traffic steering policy information to a data storage network element.

In a possible implementation method, the session management network element is further configured to: generate a forwarding rule based on the traffic steering identifier or the first traffic steering policy information; and send the forwarding rule to a user plane network element.

Figure 2A:
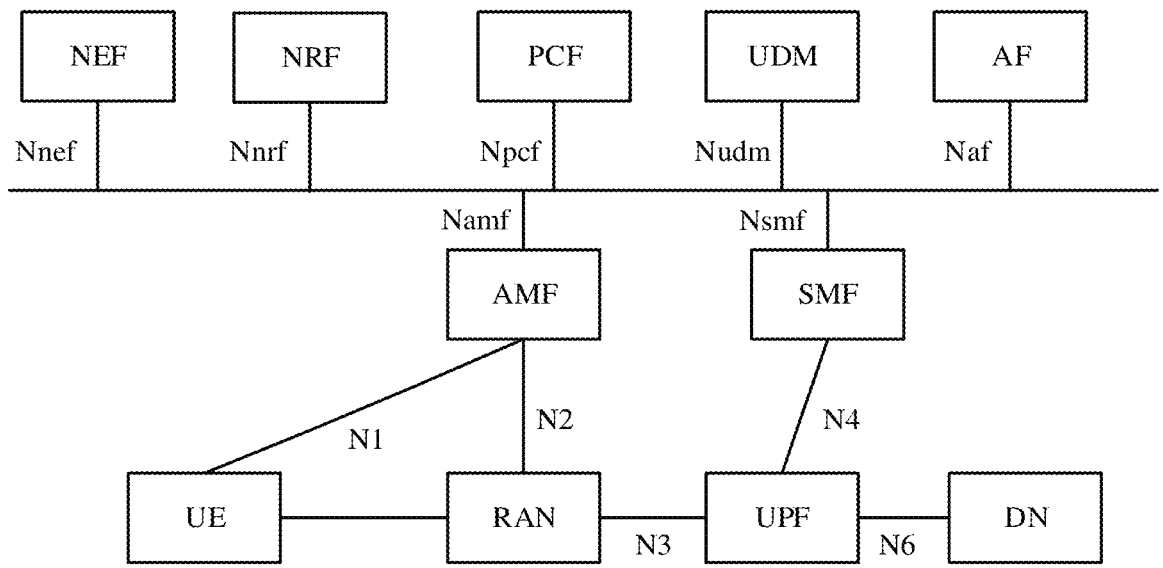
FIG. 2A is a schematic diagram of a 5G network architecture based on a service-oriented architecture.

FIG. 2A is a schematic diagram of a 5G network architecture based on a service-oriented architecture. The 5G network architecture shown in FIG. 2A may include three parts: a terminal device, a data network (DN), and a carrier network. The following briefly describes functions of some network elements.

The carrier network may include one or more of the following network elements: a network exposure function (NEF) network element, a policy control function (PCF) network element, a unified data management (UDM) network element, a network repository function (NRF) network element, an application function (AF) network element, an access and mobility management function (AMF) network element, a session management function (SMF) network element, a radio access network (RAN), a user plane function (UPF) network element, and the like. In the foregoing carrier network, parts other than the radio access network may be referred to as a core network.

The terminal device, which may also be referred to as user equipment (UE), is a device that has a wireless transceiver function. The terminal device may be deployed on land, indoor or outdoor, or may be handheld or vehicle-mounted; may be deployed on water (for example, on a ship); or may be deployed in air (for example, on an airplane, a balloon, or a satellite). The terminal device may be a mobile phone, a tablet computer (pad), a computer that has a wireless transceiver function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like.

The terminal device may establish a connection to the carrier network through an interface (for example, N1) provided by the carrier network, and use services such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide services such as a data service and/or a voice service for the terminal device. A specific representation form of the third party may be specifically determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node of the carrier network through the RAN. A RAN device in this application is a device that provides a wireless communication function for a terminal device, and the RAN device is also referred to as an access network device. The RAN device in this application includes but is not limited to: a next generation NodeB (gNB) in 5G, an evolved NodeB (eNB), a radio network controller (radio network controller, RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like.

The AMF network element is a control plane network element provided by the carrier network, and is responsible for access control and mobility management when the terminal device accesses the carrier network, for example, including functions such as mobility status management, allocation of a temporary user identity, and user authentication and authorization.

The SMF network element is mainly responsible for session management in the mobile network, such as session establishment, modification, and release. For example, a specific function is allocating an IP address to a user, and selecting a UPF that provides a packet forwarding function.

The UPF network element is responsible for forwarding and receiving user data in the terminal device. The UPF network element may receive the user data from a data network, and transmit the user data to the terminal device by using the access network device. Alternatively, the UPF network element may receive the user data from the terminal device by using the access network device, and forward the user data to a data network. A transmission resource and a scheduling function on the UPF network element that serve the terminal device are managed and controlled by an SMF network element.

The DN is a network outside the carrier network. The carrier network may access a plurality of DNs. A plurality of services may be deployed on the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may provide a service for the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

The UDM network element is configured to generate an authentication credential, process a subscriber identifier (for example, store and manage a subscription permanent identifier), control access authorization, manage subscription data, and the like.

The NEF network element is mainly used to support capability and event exposure.

The AF network element mainly supports interaction with a 3rd generation partnership project (3GPP) core network to provide services, for example, to influence data routing, control a policy, or provide some third-party services for a network side.

The PCF network element mainly supports providing a unified policy framework to control network behavior, and providing a policy rule for a control layer network function, and is responsible for obtaining policy decision-related subscription information of a user.

The NRF network element may be used to provide a network element discovery function and provide network element information corresponding to a network element type based on a request from another network element. The NRF further provides a network element management service, for example, registration, update, and deregistration of a network element and subscription and push of a network element status.

In FIG. 2A, Nnef, Npcf, Nudm, Naf, Namf, Nsmf, N1, N2, N3, N4, and N6 are interface serial numbers. For meanings of these interface sequence numbers, refer to meanings defined in the 3GPP standard protocol. This is not limited herein.

Figure 2B:
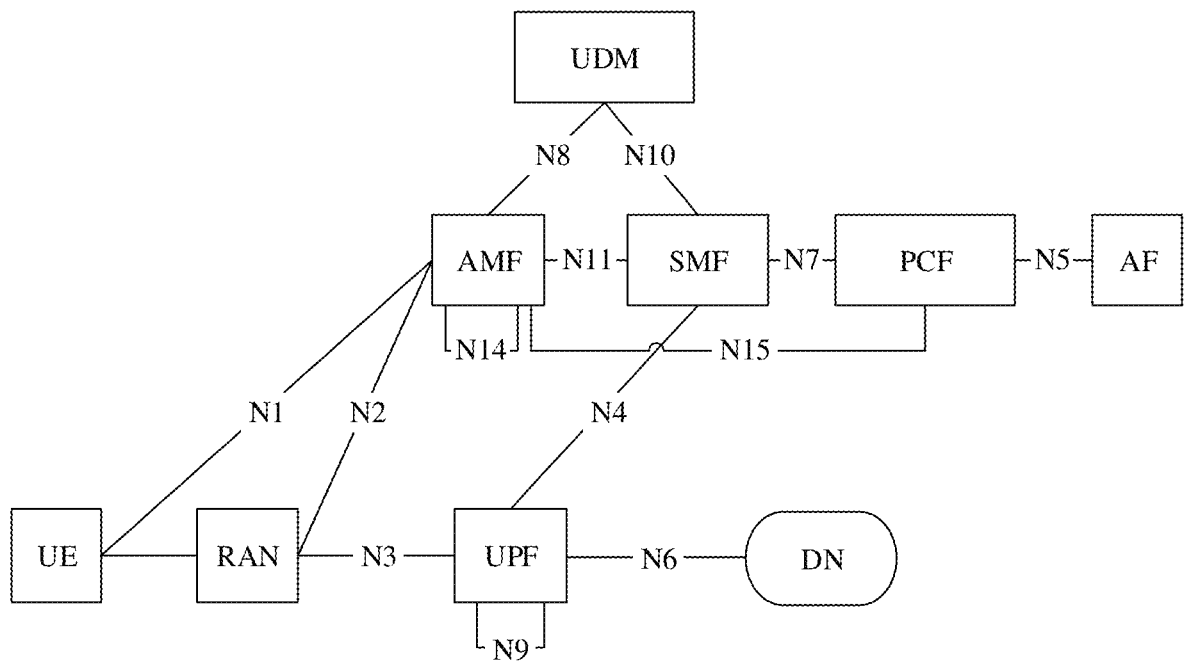
FIG. 2B is a schematic diagram of a 5G network architecture based on a point-to-point interface.

FIG. 2B is a schematic diagram of a 5G network architecture based on a point-to-point interface. For descriptions of functions of network elements in FIG. 2B, refer to descriptions of functions of corresponding network elements in FIG. 2A. Details are not described again. A main difference between FIG. 2B and FIG. 2A lies in that interfaces between network elements in FIG. 2B are point-to-point interfaces rather than service-oriented interfaces. It should be noted that FIG. 2B further includes other network elements such as an NEF and an NRF, which are not shown in FIG. 2B.

In the architecture shown in FIG. 2B, an interface between the UE and the AMF network element is referred to as an N1 interface, an interface between the AMF network element and the RAN device is referred to as an N2 interface, an interface between the RAN device and the UPF network element may be referred to as an N3 interface, an interface between the SMF network element and the UPF network element is referred to as an N4 interface, an interface between the PCF network element and the AF network element is referred to as an N5 interface, an interface between the UPF network element and a DN is referred to as an N6 interface, an interface between the SMF network element and the PCF network element is referred to as an N7 interface, an interface between the AMF network element and the UDM network element is referred to as an N8 interface, an interface between different UPF network elements is referred to as an N9 interface, an interface between the UDM network element and the SMF network element is referred to as an N10 interface, an interface between the AMF network element and the SMF network element is referred to as an N11 interface, an interface between different AMF network elements is referred to as an N14 interface, and an interface between the AMF network element and the PCF network element is referred to as an N15 interface.

It may be understood that the network elements or the functions may be network elements in a hardware device, software functions running on dedicated hardware, or virtualized functions instantiated on a platform (for example, a cloud platform). Optionally, the foregoing network elements or functions may be implemented by one device, or may be jointly implemented by a plurality of devices, or may be one function module in one device. This is not specifically limited in the embodiments of this application.

The mobility management network element, the session management network element, the policy control network element, the application function network element, the access network device, the network exposure function network element, the user plane network element, and the network storage network element in this application may be respectively the AMF, the SMF, the PCF, the AF, the RAN, the NEF, and the UPF in FIG. 2A or FIG. 2B, or may be network elements that have functions of the foregoing AMF, SMF, PCF, AF, RAN, NEF, UPF and UDR in future communication such as a 6th generation (6G) network. This is not limited in this application. For ease of description, in this application, a description is provided by using an example in which the mobility management network element, the session management network element, the policy control network element, the application function network element, the access network device, the network exposure function network element, the user plane network element, and the network storage network element are respectively the AMF, the SMF, the PCF, the AF, the RAN, the NEF, the UPF, and the UDR. In addition, a terminal device is referred to as UE for short in this application.

Figure 3:
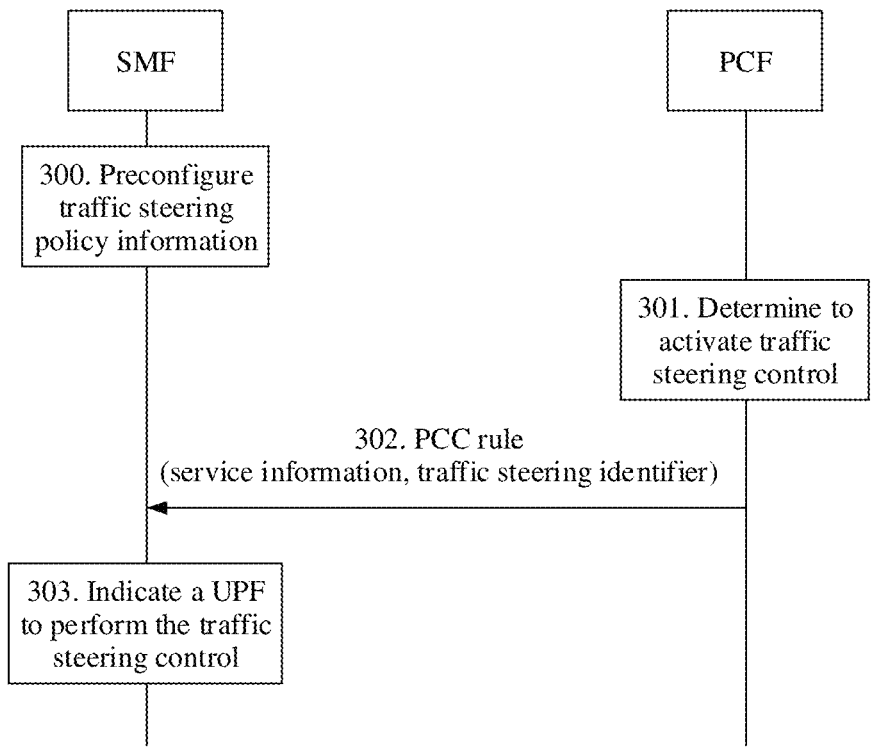
FIG. 3 is a schematic flowchart of traffic steering control in the current technology.

Traffic steering control is introduced to provide better value-added services for users. In a 5G network, the traffic steering control includes triggering, by the PCF, to activate a specific N6 traffic steering policy to steer user services to appropriate N6 service functions (such as a firewall, and distributed denial of service attack (DDoS) protection). FIG. 3 is a schematic flowchart of traffic steering control in the current technology. The following steps are included.

Step 300. Preconfigure traffic steering policy information and a traffic steering identifier on an SMF, where the traffic steering policy information includes a service function network element set and a sequence in which a service passes through service function network elements. The sequence indicates a sequence in which service data is processed by service functions.

Step 301. After UE establishes a session, a PCF determines, based on service information, to activate traffic steering control.

Step 302. The PCF sends, to the SMF, a PCC rule including the service information and the traffic steering identifier. Correspondingly, the SMF may receive the PCC rule.

Step 303. The SMF determines the traffic steering policy information based on the traffic steering identifier, and indicates, based on the traffic steering policy information, a UPF to perform the traffic steering control.

In the current technology, the traffic steering policy information is preconfigured in a core network node, and when a service occurs, the PCF determines to activate the traffic steering control for the specific service. Deployment of a 5G network is increasingly dynamic, and deployment of an application may also be dynamic. However, existing traffic steering control supports only a static management method, and does not support dynamically generating a traffic steering on demand and executing the traffic steering control.

Therefore, how to dynamically generate a traffic steering on demand is a technical problem to be resolved in this application.

The following first explains and describes some terms in the following embodiments of this application.

1. Traffic Steering Requirement

The traffic steering requirement is used to indicate a service function that a service needs to pass through. For example, the traffic steering requirement may be represented in a form of a service function set, and the service function set includes one or more service function types. For example, the service function type may be firewall, DDoS, video acceleration, or video compression.

2. Traffic Steering Network Element Information

The traffic steering network element information includes identifiers of one or more service function network elements. Optionally, the traffic steering network element information may further include location information. The location information may also be referred to as location information corresponding to the traffic steering network element information, or location information corresponding to a service function network element. The location information is used to indicate a deployment location of a service function network element or a traffic steering in the traffic steering network element information. The location information may be a data network access identifier (DNAI), a cell identifier, a tracking area identifier, IP address information (such as an IPv4 address, an IPv6 prefix, or an IP address segment), or the like.

In an implementation method, when a plurality of service function network elements corresponding to the traffic steering network element information are located at a same location, the traffic steering network element information may include only one piece of location information of the plurality of service function network elements located at the same location. Alternatively, it may be understood as that one piece of location information included in the traffic steering network element information may indicate locations of the plurality of service function network elements.

In another implementation method, for service function network elements, regardless of whether locations of these traffic steering function network elements are the same, the traffic steering network element information includes location information of each service function network element.

3. Traffic Steering Policy Information

The traffic steering policy information is used to indicate identifiers of one or more service function network elements and a sequence in which service data passes through the service function network elements. Optionally, the traffic steering policy information may further include location information corresponding to the traffic steering policy information. The location information may also be referred to as location information corresponding to the traffic steering policy information, or may be referred to as location information corresponding to a service function network element. The location information is used to indicate a deployment location, indicated by the traffic steering policy information, of a service function network element or a traffic steering. An implementation method in which the traffic steering policy information includes the location information is similar to an implementation method in which the traffic steering network element information includes the location information. For details, refer to the foregoing descriptions.

In an implementation method, the traffic steering policy information may include identifiers of service function network elements and a sequence of the service function network elements. For example, the traffic steering policy information includes network element identifiers (NF 1, NF 2, NF 3) and a sequence (NF 2, NF 3, NF 1).

In another implementation method, the traffic steering policy information may include identifiers of service function network elements, and an arranged sequence of the service function network elements implicitly indicates a sequence in which service data passes through the network elements. For example, the traffic steering policy information includes network element identifiers (NF 1, NF 2, NF 3). A sequence in which service data passes through the network elements is: NF 1, NF 2, and NF 3.

In another implementation method, the traffic steering policy information may include identifiers of service function network elements, and a sequence and location information of the service function network elements. For example, the traffic steering policy information includes network element identifiers (NF 1, NF 2, NF 3), a sequence (NF 2, NF 3, NF 1), and location information (DNAI A); or network element identifiers (NF 1, NF 2, NF 3), a sequence (NF 2, NF 3, NF 1), and location information {(NF 2, NF 3: DNAIa); NF 1: DNAIb}.

In another implementation method, the traffic steering policy information may include identifiers and location information of service function network elements, and an arranged sequence of the service function network elements implicitly indicates a sequence in which service data passes through the network elements. For example, the traffic steering policy information includes network element identifiers (NF 1, NF 2, NF 3) and location information (DNAIa, DNAIa, DNAIb). A sequence in which service data passes through the network elements is: NF 1, NF 2, and NF 3.

An identifier of a service function network element may be an address (such as an IPv6 prefix/an IPv4 address/an IPv6 address) or a fully qualified domain name (FQDN) of the service function network element, or other information used to identify the service function network element.

For a first implementation method of the traffic steering policy information, the following provides a specific example of the traffic steering policy information.

Identifier of the service function network element: identifier of firewall network element 1 and identifier of DDoS server 1.

Sequence: DDoS server 1→firewall network element 1.

Location information: firewall network element 1 (DNAI 1) and DDoS server 1 (DNAI 1).

It should be noted that one piece of traffic steering policy information may be uniquely identified by using one traffic steering identifier.

The following describes the embodiments of this application.

It should be noted that a common traffic steering identifier in any one of the following embodiments of this application may be obtained from a first network element, or may be allocated by the PCF. A unified description is provided herein, and details are not described below.

Based on the architecture shown in FIG. 1A, FIG. 1B, FIG. 2A, or FIG. 2B, FIG. 4A is a schematic flowchart of a communication method according to this application. In this embodiment, traffic steering policy information is configured in a first network element, and the first network element may be a UDR or an EC platform. A PCF may obtain the traffic steering policy information from the first network element.

The EC platform includes at least one control plane network element. That the PCF obtains the traffic steering policy information from the EC platform may be specifically: The PCF obtains the traffic steering policy information from a control plane network element of the EC platform.

The method includes the following steps.

Step 401*a*. An AF sends first information to the PCF. Correspondingly, the PCF may receive the first information.

The first information may be service information or a traffic steering requirement. The traffic steering requirement includes one or more service functions, that is, the traffic steering requirement includes one or more service function types.

In an implementation method, the AF may directly send the first information to the PCF.

In another implementation method, the AF may send a first request message to an NEF, where the first request message carries the first information; and then the NEF sends a second request message to the PCF, where the second request message carries the first information. The first request message and the second request message herein may be a same message, or may be different messages.

In another implementation method, the AF may send a first request message to an NEF, where the first request message carries second information; and then the NEF sends a second request message to the PCF, where the second request message carries the first information, and the first information is determined by the NEF based on the second information.

Step 402*a*. The PCF obtains first traffic steering policy information from the first network element based on the first information, where the first traffic steering policy information includes at least one piece of traffic steering policy information, and the traffic steering policy information is used to indicate network elements corresponding to at least one service function and a sequence in which service data passes through the network elements corresponding to the at least one service function.

Based on the foregoing solution, the PCF can dynamically obtain the corresponding traffic steering policy information from the first network element based on the first information sent by the AF, thereby dynamically configuring a traffic steering policy.

The following separately describes the foregoing solutions in different cases.

It should be noted that, location information corresponding to a service that appears anywhere in this application may be understood as location information of service deployment, or may be understood as location information of a server that provides the service, or may be understood as location information of a user plane that accesses the service. In an implementation method, the location information corresponding to the service may be location information of a terminal device.

Case 1: The first information is the traffic steering requirement.

Implementation Method 1

In this case, implementation method 1 of step 402*a* is as follows: The PCF sends the traffic steering requirement to the first network element. The first network element obtains the corresponding traffic steering policy information, that is, the first traffic steering policy information, based on the traffic steering requirement. Then, the first network element sends the first traffic steering policy information corresponding to the traffic steering requirement to the PCF.

Based on implementation method 1 described above, optionally, if the PCF further receives the location information corresponding to the service from the AF, an SMF, or a UDR (for example, the PCF may receive the location information corresponding to the service before, after, or in step 401*a*), when the PCF sends the traffic steering requirement to the first network element, the PCF may further send the location information corresponding to the service to the first network element, so that the first network element determines the first traffic steering policy information based on the traffic steering requirement and the location information corresponding to the service, and sends the first traffic steering policy information to the PCF. That is, in this solution, the first traffic steering policy information received by the PCF corresponds to the traffic steering requirement and the location information corresponding to the service. After obtaining the first traffic steering policy information, the PCF sends the first traffic steering policy information or a traffic steering identifier corresponding to the first traffic steering policy information to the SMF, so that the SMF generates a forwarding rule such as a forwarding action rule (FAR) based on the first traffic steering policy information. The forwarding rule is used by a UPF to forward data. The first traffic steering policy information includes location information, and the location information is used to indicate a location of a service function network element corresponding to the traffic steering policy information. The traffic steering identifier may be obtained by the PCF from the first network element or allocated by the PCF.

Based on implementation method 1 described above, optionally, if the PCF further receives the location information corresponding to the service from the AF, an SMF, or a UDR (for example, the PCF may receive the location information corresponding to the service before, after, or in step 401*a*), the PCF may send the traffic steering requirement to the first network element, but does not send the location information corresponding to the service. After receiving the first traffic steering policy information that corresponds to the traffic steering requirement and that is sent by the first network element, the PCF determines second traffic steering policy information based on the first traffic steering policy information and the location information corresponding to the service, and then sends the second traffic steering policy information or a traffic steering identifier corresponding to the second traffic steering policy information to the SMF, so that the SMF generates a forwarding rule such as an FAR based on the second traffic steering policy information. The forwarding rule is used by the UPF to forward data. The second traffic steering policy information includes the location information.

Implementation Method 2

In this case, implementation method 2 of step 402*a* is as follows: After receiving the traffic steering requirement, the PCF is triggered to obtain the traffic steering policy information from the first network element, and the PCF does not send the traffic steering requirement to the first network element, so that the first network element sends all traffic steering policy information (that is, the first traffic steering policy information) to the PCF. Then, the PCF determines third traffic steering policy information based on the traffic steering requirement and the first traffic steering policy information, and sends the third traffic steering policy information or a traffic steering identifier corresponding to the third traffic steering policy information to an SMF, so that the SMF generates a forwarding rule such as an FAR based on the third traffic steering policy information. The forwarding rule is used by a UPF to forward data. The third traffic steering policy information includes the location information.

Based on implementation method 2, optionally, if the PCF further receives the location information corresponding to the service from the AF, the SMF, or a UDR (for example, the PCF may receive the location information corresponding to the service before, after, or in step 401*a*), triggered by the traffic steering requirement (it should be noted that the traffic steering requirement is not sent to the first network element), the PCF may send the location information corresponding to the service to the first network element, so that the first network element determines the first traffic steering policy information based on the location information corresponding to the service, and sends the first traffic steering policy information to the PCF. That is, in this solution, the first traffic steering policy information received by the PCF corresponds to the location information corresponding to the service. After obtaining the first traffic steering policy information, the PCF determines third traffic steering policy information based on the traffic steering requirement and the first traffic steering policy information, and sends the third traffic steering policy information or a traffic steering identifier corresponding to the third traffic steering policy information to the SMF, so that the SMF generates a forwarding rule such as an FAR based on the third traffic steering policy information. The forwarding rule is used by the UPF to forward data. The third traffic steering policy information includes the location information.

Based on implementation method 2, optionally, if the PCF further receives the location information corresponding to the service from the AF, the SMF, or the UDR (for example, the PCF may receive the location information corresponding to the service before, after, or in step 401*a*), triggered by the traffic steering requirement (it should be noted that the traffic steering requirement is not sent to the first network element), the PCF requests to obtain the traffic steering policy information from the first network element, so that the first network element determines all traffic steering policy information, that is, the first traffic steering policy information, and sends the first traffic steering policy information to the PCF. Then, the PCF determines third traffic steering policy information based on the traffic steering requirement, the first traffic steering policy information, and the location information corresponding to the service, and sends the third traffic steering policy information or a traffic steering identifier corresponding to the third traffic steering policy information to the SMF, so that the SMF generates a forwarding rule such as an FAR based on the third traffic steering policy information. The forwarding rule is used by the UPF to forward data. The third traffic steering policy information includes the location information.

Case 2: The first information is the service information.

Implementation Method 1

In this case, implementation method 1 of step 402*a* is as follows: The PCF sends the service information to the first network element. The first network element obtains the corresponding traffic steering policy information, that is, the first traffic steering policy information, based on the service information. Then, the first network element sends the first traffic steering policy information corresponding to the service information to the PCF.

Based on implementation method 1 described above, optionally, if the PCF further receives the location information corresponding to the service from the AF, an SMF, or a UDR (for example, the PCF may receive the location information corresponding to the service before, after, or in step 401*a*), when the PCF sends the service information to the first network element, the PCF may further send the location information corresponding to the service to the first network element, so that the first network element determines the first traffic steering policy information based on the service information and the location information corresponding to the service, and sends the first traffic steering policy information to the PCF. That is, in this solution, the first traffic steering policy information received by the PCF corresponds to the service information and the location information corresponding to the service. After obtaining the first traffic steering policy information, the PCF sends the first traffic steering policy information or a traffic steering identifier corresponding to the first traffic steering policy information to the SMF, so that the SMF generates a forwarding rule such as an FAR based on the first traffic steering policy information. The forwarding rule is used by the UPF to forward data. The first traffic steering policy information includes the location information.

Based on implementation method 1 described above, optionally, if the PCF further receives the location information corresponding to the service from the AF, an SMF, or a UDR (for example, the PCF may receive the location information corresponding to the service before, after, or in step 401$a$), the PCF may send the service information to the first network element, but does not send the location information corresponding to the service. After receiving the first traffic steering policy information that corresponds to the service information and that is sent by the first network element, the PCF determines second traffic steering policy information based on the first traffic steering policy information and the location information corresponding to the service, and then sends the second traffic steering policy information or a traffic steering identifier corresponding to the second traffic steering policy information to the SMF, so that the SMF generates a forwarding rule such as an FAR based on the second traffic steering policy information. The forwarding rule is used by the UPF to forward data. The second traffic steering policy information includes the location information.

Implementation Method 2

In this case, implementation method 2 of step 402$a$ is as follows: The PCF determines the traffic steering requirement based on the service information, and then sends the traffic steering requirement to the first network element. The first network element obtains the corresponding traffic steering policy information, that is, the first traffic steering policy information, based on the traffic steering requirement. Then, the first network element sends the first traffic steering policy information corresponding to the traffic steering requirement to the PCF.

Based on implementation method 2 described above, optionally, if the PCF further receives the location information corresponding to the service from the AF, an SMF, or a UDR (for example, the PCF may receive the location information corresponding to the service before, after, or in step 401$a$), when the PCF sends the traffic steering requirement to the first network element, the PCF may further send the location information corresponding to the service to the first network element, so that the first network element determines the first traffic steering policy information based on the traffic steering requirement and the location information corresponding to the service, and sends the first traffic steering policy information to the PCF. That is, in this solution, the first traffic steering policy information received by the PCF corresponds to the traffic steering requirement and the location information corresponding to the service. After obtaining the first traffic steering policy information, the PCF sends the first traffic steering policy information or a traffic steering identifier corresponding to the first traffic steering policy information to the SMF, so that the SMF generates a forwarding rule such as a forwarding action rule (FAR) based on the first traffic steering policy information. The forwarding rule is used by a UPF to forward data. The first traffic steering policy information includes the location information.

Based on implementation method 2 described above, optionally, if the PCF further receives the location information corresponding to the service from the AF, an SMF, or a UDR (for example, the PCF may receive the location information corresponding to the service before, after, or in step 401$a$), the PCF may send the traffic steering requirement to the first network element, but does not send the location information corresponding to the service. After receiving the first traffic steering policy information that corresponds to the traffic steering requirement and that is sent by the first network element, the PCF determines second traffic steering policy information based on the first traffic steering policy information and the location information corresponding to the service, and then sends the second traffic steering policy information or a traffic steering identifier corresponding to the second traffic steering policy information to the SMF, so that the SMF generates a forwarding rule such as an FAR based on the second traffic steering policy information. The forwarding rule is used by the UPF to forward data. The second traffic steering policy information includes the location information.

Implementation Method 3

In this case, implementation method 3 of step 402$a$ is as follows: After receiving the service information, the PCF is triggered to obtain the traffic steering policy information from the first network element, and the PCF does not send the service information to the first network element, so that the first network element sends all traffic steering policy information (that is, the first traffic steering policy information) to the PCF. The PCF determines third traffic steering policy information based on the service information and the first traffic steering policy information, and sends the third traffic steering policy information or a traffic steering identifier corresponding to the third traffic steering policy information to an SMF, so that the SMF generates a forwarding rule such as an FAR based on the third traffic steering policy information. The forwarding rule is used by a UPF to forward data. The third traffic steering policy information includes the location information.

Based on implementation method 3 described above, optionally, if the PCF further receives the location information corresponding to the service from the AF, the SMF, or a UDR (for example, the PCF may receive the location information corresponding to the service before, after, or in step 401$a$), triggered by the service information (it should be noted that the service information is not sent to the first network element), the PCF may send the location information corresponding to the service to the first network element, so that the first network element determines the first traffic steering policy information based on the location information corresponding to the service, and sends the first traffic steering policy information to the PCF. That is, in this solution, the first traffic steering policy information received by the PCF corresponds to the location information corresponding to the service. After obtaining the first traffic steering policy information, the PCF determines third traffic steering policy information based on the service information and the first traffic steering policy information, and sends the third traffic steering policy information or a traffic steering identifier corresponding to the third traffic steering policy information to the SMF, so that the SMF generates a forwarding rule such as an FAR based on the third traffic steering policy information. The forwarding rule is used by the UPF to forward data. The third traffic steering policy information includes the location information.

Based on implementation method 3 described above, optionally, if the PCF further receives the location information corresponding to the service from the AF, an SMF, or a UDR (for example, the PCF may receive the location information corresponding to the service before, after, or in step 401*a*), triggered by the service information (it should be noted that the service information is not sent to the first network element), the PCF requests to obtain the traffic steering policy information from the first network element, so that the first network element determines all traffic steering policy information, that is, the first traffic steering policy information, and sends the first traffic steering policy information to the PCF. Then, the PCF determines third traffic steering policy information based on the service information, the first traffic steering policy information, and the location information corresponding to the service, and sends the third traffic steering policy information or a traffic steering identifier corresponding to the third traffic steering policy information to the SMF, so that the SMF generates a forwarding rule such as an FAR based on the third traffic steering policy information. The forwarding rule is used by the UPF to forward data. The third traffic steering policy information includes the location information.

Based on the architecture shown in FIG. 1A, FIG. 1B, FIG. 2A, or FIG. 2B, FIG. 4B is a schematic flowchart of a communication method according to this application. In this embodiment, traffic steering network element information is configured in a first network element, and the first network element may be a UDR or an EC platform. The PCF may obtain the traffic steering network element information from the first network element, and then the PCF determines the traffic steering policy information based on the traffic steering network element information.

The method includes the following steps.

Step 401*b*. An AF sends first information to the PCF. Correspondingly, the PCF may receive the first information.

In an implementation method, the AF may directly send the first information to the PCF.

In another implementation method, the AF may send a first request message to an NEF, where the first request message carries the first information; and then the NEF sends a second request message to the PCF, where the second request message carries the first information. The first request message and the second request message herein may be a same message, or may be different messages.

The first information may be service information or a traffic steering requirement. The traffic steering requirement includes one or more service functions, that is, the traffic steering requirement includes one or more service function types.

Step 402*b*. The PCF obtains traffic steering network element information from the first network element based on the first information, where the traffic steering policy information includes network elements corresponding to at least one service function.

Step 403*b*. The PCF determines the traffic steering policy information based on the traffic steering network element information, where the traffic steering policy information is used to indicate the network elements corresponding to the at least one service function and a sequence in which service data passes through the network elements corresponding to the at least one service function.

Based on the foregoing solution, the PCF can dynamically obtain the corresponding traffic steering network element information from the first network element based on the first information sent by the AF, and then determine the traffic steering policy information based on the traffic steering network element information, thereby dynamically configuring a traffic steering policy.

The following separately describes the foregoing solutions in different cases.

Case 1: The first information is the traffic steering requirement.

In this case, implementation method 1 of step 402*b* is as follows: The PCF sends the traffic steering requirement to the first network element. The first network element obtains the corresponding traffic steering network element information based on the traffic steering requirement. Then, the first network element sends the traffic steering network element information corresponding to the traffic steering requirement to the PCF.

Based on implementation method 1 described above, if the PCF further receives the location information corresponding to the service from the AF, an SMF, or a UDR (for example, the PCF may receive the location information corresponding to the service before, after, or in step 401*b*), when the PCF sends the traffic steering requirement to the first network element, the PCF may further send the location information corresponding to the service to the first network element, so that the first network element determines the traffic steering network element information based on the location information corresponding to the service and the traffic steering requirement, and sends the traffic steering network element information to the PCF. That is, in this solution, the traffic steering network element information received by the PCF corresponds to the location information corresponding to the service, and the traffic steering requirement. After obtaining the traffic steering network element information, the PCF determines the traffic steering policy information based on the traffic steering network element information, and sends the traffic steering policy information to the SMF, so that the SMF generates a forwarding rule such as an FAR based on the traffic steering policy information.

Based on implementation method 1, if the PCF further receives the location information corresponding to the service from the AF, an SMF, or a UDR (for example, the PCF may receive the location information corresponding to the service before, after, or in step 401*b*), when the PCF sends the traffic steering requirement to the first network element, the PCF may not send the location information corresponding to the service to the first network element, so that the first network element determines the traffic steering network element information based on the traffic steering requirement, and sends the traffic steering network element information to the PCF. That is, in this solution, the traffic steering network element information received by the PCF corresponds to the traffic steering requirement. After obtaining the traffic steering network element information, the PCF determines the traffic steering policy information based on the traffic steering network element information and the location information corresponding to the service, and sends the traffic steering policy information to the SMF, so that the SMF generates a forwarding rule such as an FAR based on the traffic steering policy information.

In this case, implementation method 2 of step 402*b* is as follows: After the PCF receives the traffic steering requirement, the PCF is triggered to obtain the traffic steering network element information from the first network element, that is, the PCF does not send the traffic steering requirement to the first network element, and the first network element sends all traffic steering network element information to the PCF, so that after receiving the traffic steering network element information, the PCF may determine the traffic steering policy information based on the traffic steering network element information and the traffic steering requirement.

Based on implementation method 2, if the PCF further receives the location information corresponding to the service from the AF, an SMF, or a UDR (for example, the PCF may receive the location information corresponding to the service before, after, or in step 401b), the PCF may send the location information corresponding to the service to the first network element, so that the first network element determines the traffic steering network element information based on the location information corresponding to the service, and sends the traffic steering network element information to the PCF. That is, in this solution, the traffic steering network element information received by the PCF corresponds to the location information corresponding to the service. After obtaining the traffic steering network element information, the PCF determines the traffic steering policy information based on the traffic steering network element information and the traffic steering requirement, and sends the traffic steering policy information to the SMF, so that the SMF generates a forwarding rule such as an FAR based on the traffic steering policy information.

Based on implementation method 2, if the PCF further receives the location information corresponding to the service from the AF, an SMF, or a UDR (for example, the PCF may receive the location information corresponding to the service before, after, or in step 401b), the PCF may not send the location information corresponding to the service to the first network element, so that the first network element determines all traffic steering network element information, and sends the traffic steering network element information to the PCF. After obtaining the traffic steering network element information, the PCF determines the traffic steering policy information based on the traffic steering network element information, the traffic steering requirement, and the location information corresponding to the service, and sends the traffic steering policy information to the SMF, so that the SMF generates a forwarding rule such as an FAR based on the traffic steering policy information.

Case 2: The first information is the service information.

In this case, implementation method 1 of step 402b is as follows: The PCF determines the traffic steering requirement based on the service information, and sends the traffic steering requirement to the first network element. The first network element obtains the corresponding traffic steering network element information based on the traffic steering requirement, and then the first network element sends the traffic steering network element information corresponding to the traffic steering requirement to the PCF.

Based on implementation method 1 described above, if the PCF further receives the location information corresponding to the service from the AF, an SMF, or a UDR (for example, the PCF may receive the location information corresponding to the service before, after, or in step 401b), when the PCF sends the traffic steering requirement to the first network element, the PCF may further send the location information corresponding to the service to the first network element, so that the first network element determines the traffic steering network element information based on the location information corresponding to the service and the traffic steering requirement, and sends the traffic steering network element information to the PCF. That is, in this solution, the traffic steering network element information received by the PCF corresponds to the location information corresponding to the service, and the traffic steering requirement. After obtaining the traffic steering network element information, the PCF determines the traffic steering policy information based on the traffic steering network element information, and sends the traffic steering policy information to the SMF, so that the SMF generates a forwarding rule such as an FAR based on the traffic steering policy information.

Based on implementation method 1, if the PCF further receives the location information corresponding to the service from the AF, an SMF, or a UDR (for example, the PCF may receive the location information corresponding to the service before, after, or in step 401b), when the PCF sends the traffic steering requirement to the first network element, the PCF may not send the location information corresponding to the service to the first network element, so that the first network element determines the traffic steering network element information based on the traffic steering requirement, and sends the traffic steering network element information to the PCF. That is, in this solution, the traffic steering network element information received by the PCF corresponds to the traffic steering requirement. After obtaining the traffic steering network element information, the PCF determines the traffic steering policy information based on the traffic steering network element information and the location information corresponding to the service, and sends the traffic steering policy information to the SMF, so that the SMF generates a forwarding rule such as an FAR based on the traffic steering policy information.

In this case, implementation method 2 of step 402b is as follows: The PCF sends the service information to the first network element. The first network element obtains the corresponding traffic steering network element information based on the service information. Then, the first network element sends the traffic steering network element information corresponding to the service information to the PCF.

Based on implementation method 2, if the PCF further receives the location information corresponding to the service from the AF, an SMF, or a UDR (for example, the PCF may receive the location information corresponding to the service before, after, or in step 401b), when the PCF sends the service information to the first network element, the PCF may further send the location information corresponding to the service to the first network element, so that the first network element determines the traffic steering network element information based on the location information corresponding to the service and the service information, and sends the traffic steering network element information to the PCF. That is, in this solution, the traffic steering network element information received by the PCF corresponds to the location information corresponding to the service, and the service information. After obtaining the traffic steering network element information, the PCF determines the traffic steering policy information based on the traffic steering network element information, and sends the traffic steering policy information to the SMF, so that the SMF generates a forwarding rule such as an FAR based on the traffic steering policy information.

Based on implementation method 2, if the PCF further receives the location information corresponding to the service from the AF, an SMF, or a UDR (for example, the PCF may receive the location information corresponding to the service before, after, or in step 401b), when the PCF sends the service information to the first network element, the PCF may not send the location information corresponding to the service to the first network element, so that the first network element determines the traffic steering network element information based on the traffic steering requirement, and sends the traffic steering network element information to the PCF. That is, in this solution, the traffic steering network element information received by the PCF corresponds to the service information. After obtaining the traffic steering network element information, the PCF determines the traffic steering policy information based on the traffic steering network element information and the location information corresponding to the service, and sends the traffic steering policy information to the SMF, so that the SMF generates a forwarding rule such as an FAR based on the traffic steering policy information.

In this case, implementation method 3 of step 402*b* is as follows: After the PCF receives the service information, the PCF is triggered to obtain the traffic steering network element information from the first network element, that is, the PCF does not send the service information to the first network element, and the first network element sends all traffic steering network element information to the PCF, so that after receiving the traffic steering network element information, the PCF may determine the traffic steering policy information based on the traffic steering network element information and the service information.

Based on implementation method 3, if the PCF further receives the location information corresponding to the service from the AF, an SMF, or a UDR (for example, the PCF may receive the location information corresponding to the service before, after, or in step 401*b*), the PCF may send the location information corresponding to the service to the first network element, so that the first network element determines the traffic steering network element information based on the location information corresponding to the service, and sends the traffic steering network element information to the PCF. That is, in this solution, the traffic steering network element information received by the PCF corresponds to the location information corresponding to the service. After obtaining the traffic steering network element information, the PCF determines the traffic steering policy information based on the traffic steering network element information and the service information, and sends the traffic steering policy information to the SMF, so that the SMF generates a forwarding rule such as an FAR based on the traffic steering policy information.

Based on implementation method 3, if the PCF further receives the location information corresponding to the service from the AF, an SMF, or a UDR (for example, the PCF may receive the location information corresponding to the service before, after, or in step 401*b*), the PCF may not send the location information corresponding to the service to the first network element, so that the first network element determines all traffic steering network element information, and sends the traffic steering network element information to the PCF. After obtaining the traffic steering network element information, the PCF determines the traffic steering policy information based on the traffic steering network element information, the service information, and the location information corresponding to the service, and sends the traffic steering policy information to the SMF, so that the SMF generates a forwarding rule such as an FAR based on the traffic steering policy information.

Based on the architecture shown in FIG. 1A, FIG. 1B, FIG. 2A, or FIG. 2B, FIG. 4C is a schematic flowchart of a communication method according to this application. In this embodiment, traffic steering policy information and a traffic steering identifier are configured in a first network element. One traffic steering identifier is used to identify one piece of traffic steering policy information. The first network element may be a UDR or an EC platform. A PCF or an SMF may obtain the traffic steering policy information from the first network element by using the traffic steering identifier.

The method includes the following steps.

Step 401*c*. An AF sends a traffic steering identifier to a first PCF. Correspondingly, the first PCF may receive the traffic steering identifier. The traffic steering identifier is used to indicate first traffic steering policy information. The first traffic steering policy information is used to indicate network elements corresponding to at least one service function and a sequence in which service data passes through the network elements corresponding to the at least one service function.

Step 402*c*. The first PCF sends the traffic steering identifier or the first traffic steering policy information to an SMF, where the traffic steering identifier is used to determine the first traffic steering policy information. Correspondingly, the SMF may receive the traffic steering identifier or the first traffic steering policy information.

If the first PCF sends the traffic steering identifier to the SMF, the SMF may send the traffic steering identifier to the first network element, and then the first network element returns the traffic steering policy information corresponding to the traffic steering identifier to the SMF.

If the first PCF sends the first traffic steering policy information to the SMF, the first traffic steering policy information may be obtained through the following method: The first PCF sends the traffic steering identifier to the first network element, and the first network element returns the first traffic steering policy information corresponding to the traffic steering identifier to the first PCF.

Based on the foregoing solution, the first PCF can dynamically obtain the corresponding traffic steering policy information from the first network element based on the traffic steering identifier sent by the AF, or send the traffic steering identifier to the SMF, so that the SMF dynamically obtains the corresponding traffic steering policy information from the first network element, thereby dynamically configuring a traffic steering policy.

Figure 4A:
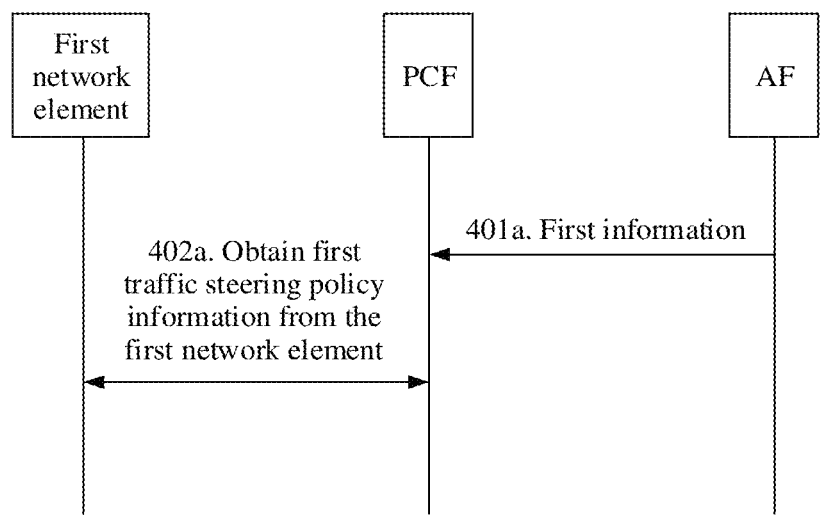
FIG. 4A is a schematic flowchart of a communication method according to this application.
Figure 4B:
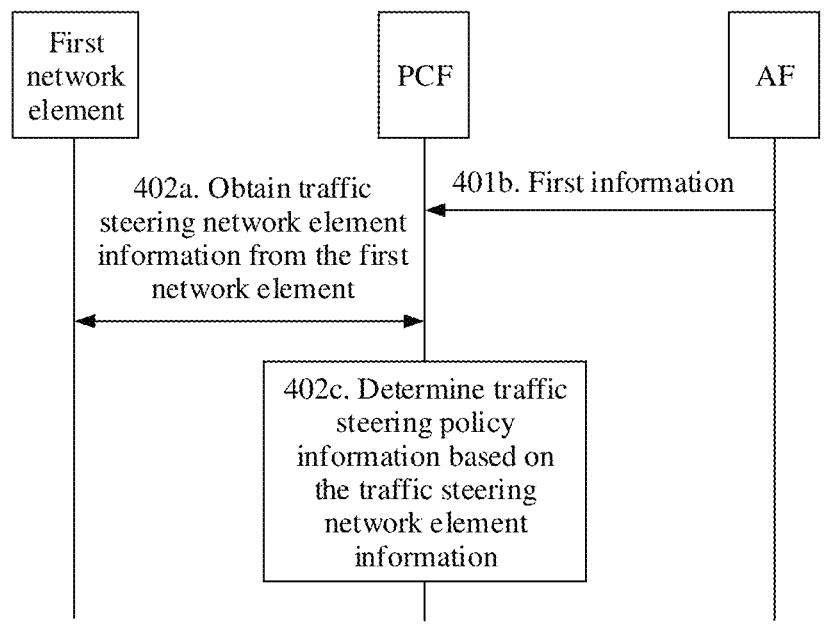
FIG. 4B is a schematic flowchart of another communication method according to this application.
Figure 4C:
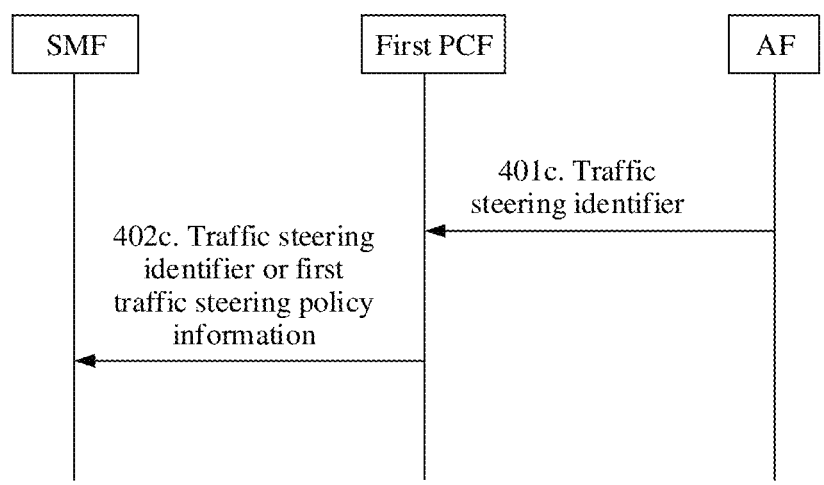
FIG. 4C is a schematic flowchart of another communication method according to this application.
Figure 4D:
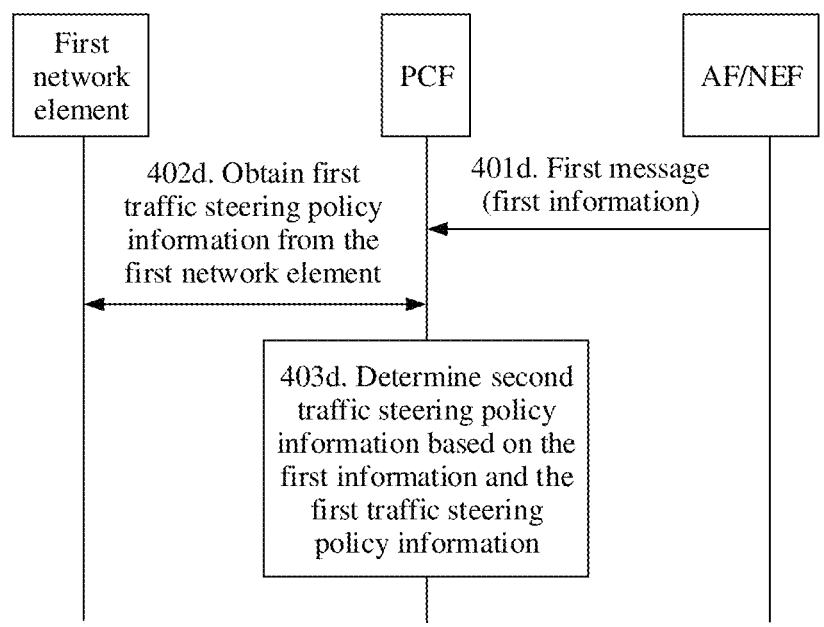
FIG. 4D is a schematic flowchart of another communication method according to this application.

In an implementation method, the traffic steering identifier stored in the AF, and the traffic steering identifier and the traffic steering policy information that are stored in the first network element may be obtained through negotiation between a second PCF (where the second PCF may be the same as or different from the first PCF) and the AF before the embodiment of FIG. 4C. That is, before the embodiment of FIG. 4C, a negotiation procedure of the traffic steering policy information is further included. The following describes six negotiation methods.

Negotiation method 1: The second PCF receives first information from the AF, where the first information is service information or a traffic steering requirement, and the traffic steering requirement includes at least one service function. The second PCF obtains traffic steering network element information from the first network element based on the first information, where the traffic steering network element information includes network elements corresponding to the at least one service function. The PCF determines first traffic steering policy information and a traffic steering identifier based on the traffic steering network element information. The PCF sends the first traffic steering policy information and the traffic steering identifier to the AF.

Negotiation method 2: The second PCF receives first information from the AF, where the first information is service information or a traffic steering requirement, and the traffic steering requirement includes at least one service function. The second PCF obtains second traffic steering policy information from the first network element. The second PCF determines first traffic steering policy information and a traffic steering identifier based on the second traffic steering policy information and the first information. The second PCF sends the first traffic steering policy information and the traffic steering identifier to the AF.

Negotiation method 3: The second PCF receives first information, where the first information is service information or a traffic steering requirement, and the traffic steering requirement includes at least one service function. The second PCF obtains traffic steering network element information from the first network element based on the first information, where the traffic steering network element information includes network elements corresponding to the at least one service function. The second PCF determines first traffic steering policy information and/or a traffic steering identifier based on the traffic steering network element information and the first information. The second PCF sends the first traffic steering policy information and/or the traffic steering identifier to the AF.

Negotiation method 4: The second PCF receives a first message, where the first message includes first information, the first information is service information or a traffic steering requirement, and the traffic steering requirement includes at least one service function. The second PCF obtains traffic steering network element information from the first network element based on the first message, where the traffic steering network element information includes network elements corresponding to the at least one service function. The second PCF determines the first traffic steering policy information and/or the traffic steering identifier based on the traffic steering network element information. The second PCF sends the first traffic steering policy information and/or the traffic steering identifier to the AF.

Negotiation method 5: The second PCF receives first information, where the first information is service information or a traffic steering requirement, and the traffic steering requirement includes at least one service function. The second PCF obtains traffic steering policy information from the first network element based on the first information. The second PCF determines the first traffic steering policy information and/or the traffic steering identifier based on the traffic steering policy information. The second PCF sends the first traffic steering policy information and/or the traffic steering identifier to the AF.

Negotiation method 6: The second PCF receives a first message, where the first message includes first information, the first information is service information or a traffic steering requirement, and the traffic steering requirement includes at least one service function. The second PCF obtains second traffic steering policy information from the first network element based on the first message. The second PCF determines the first traffic steering policy information and/or the traffic steering identifier based on the second traffic steering policy information and the first information. The second PCF sends the first traffic steering policy information and/or the traffic steering identifier to the AF.

Based on any one of the foregoing negotiation methods, further, the second PCF may further send the first traffic steering policy information and/or the traffic steering identifier to the UDR, so that the UDR may store the first traffic steering policy information and the traffic steering identifier.

It should be noted that in the embodiment shown in FIG. 4C, the second PCF and the first PCF may be a same PCF, or may be different PCFs. This is not limited in this application.

It should be noted that, for any embodiment shown in FIG. 4A to FIG. 4C, in an implementation method, after the SMF receives traffic steering policy information sent by the PCF, the SMF generates a forwarding rule based on the traffic steering policy information, and determines a UPF based on location information corresponding to a service in the traffic steering policy information. Then, the SMF sends the forwarding rule to the UPF, so that the UPF can forward data according to the forwarding rule.

Based on the architecture shown in FIG. 1A, FIG. 1B, FIG. 2A, or FIG. 2B, FIG. 4D is a schematic flowchart of another communication method according to this application. In this embodiment, traffic steering policy information is configured in a first network element, and the first network element may be a UDR or an EC platform. A PCF may obtain the traffic steering policy information from the first network element.

The method includes the following steps.

Step 401d. The PCF receives a first message, where the first message includes first information, the first information may be service information or a traffic steering requirement, and the traffic steering requirement includes one or more service functions, that is, the traffic steering requirement includes one or more service function types.

In an implementation method, an AF may directly send the first message to the PCF.

In another implementation method, an AF may send a request message to an NEF, where the request message carries the first information; and then the NEF sends the first message to the PCF. The request message and the first message herein may be a same message, or may be different messages.

In another implementation method, the AF may send a first request message to an NEF, where the first request message carries second information; and then the NEF sends a second request message to the PCF, where the second request message carries the first information, and the first information is determined by the NEF based on the second information.

Step 402d. The PCF obtains first traffic steering policy information from the first network element based on the first message, where the first traffic steering policy information includes at least one piece of traffic steering policy information, and the traffic steering policy information is used to indicate network elements corresponding to at least one service function and a sequence in which service data passes through the network elements corresponding to the at least one service function.

In this step, after receiving the first message, the PCF may determine, by identifying a name of the first message (without a need to interpret content of the first message), that the first traffic steering policy information needs to be obtained from the first network element. This may also be understood as that the first message triggers the PCF to obtain the first traffic steering policy information from the first network element.

Step 403d. The PCF determines second traffic steering policy information based on the first information and the first traffic steering policy information.

After obtaining the first traffic steering policy information from the first network element, the PCF further selects, from the first traffic steering policy information based on the first information, traffic steering policy information related to the first information, that is, the second traffic steering policy information.

Optionally, after determining the second traffic steering policy information, the PCF sends the second traffic steering policy information or a traffic steering identifier corresponding to the second traffic steering policy information to the SMF, so that the SMF generates a forwarding rule such as an FAR based on the second traffic steering policy information. The forwarding rule is used by a UPF to forward data. The second traffic steering policy information may further include location information.

The traffic steering identifier corresponding to the second traffic steering policy information may be allocated by the PCF, or received from the first network element.

Based on the foregoing solution, the PCF can dynamically obtain the corresponding traffic steering policy information, thereby dynamically configuring a traffic steering policy.

Optionally, in the foregoing solution, the traffic steering policy information may alternatively be determined with reference to location information corresponding to a service.

In an implementation method, if the PCF further receives the location information corresponding to the service (for example, the PCF may receive the location information corresponding to the service before, after, or in step 401*d*), in a first solution, step 402*d* is specifically: The PCF obtains the first traffic steering policy information from the first network element based on the first message and the location information corresponding to the service. Specifically, after identifying the first message, the PCF sends the location information corresponding to the service to the first network element. Then, the first network element determines, based on the location information corresponding to the service, the first traffic steering policy information corresponding to the location information corresponding to the service, and then sends the first traffic steering policy information to the PCF. Therefore, the second traffic steering policy information determined in step 403*d* also corresponds to the location information corresponding to the service.

In a second solution, the location information corresponding to the service is not sent to the first network element in step 402*d*, and the first traffic steering policy information received by the PCF includes location information corresponding to the at least one service function. Step 403*d* is specifically: The PCF determines the second traffic steering policy information based on the first information, the location information corresponding to the service, and the first traffic steering policy information. That is, the PCF determines, from the first traffic steering policy information based on the first information and the location information corresponding to the service, the second traffic steering policy information corresponding to the first information and the location information corresponding to the service. It should be noted that, for any embodiment shown in FIG. 4A to FIG. 4D, in an implementation method, the traffic steering policy information or the traffic steering network element information in the UDR may be configured through the following method: The EC platform or the AF configures the traffic steering policy information or the traffic steering network element information for the UDR by using the NEF.

For the embodiments shown in FIG. 4A to FIG. 4D, the following provides specific implementations.

Figure 5:
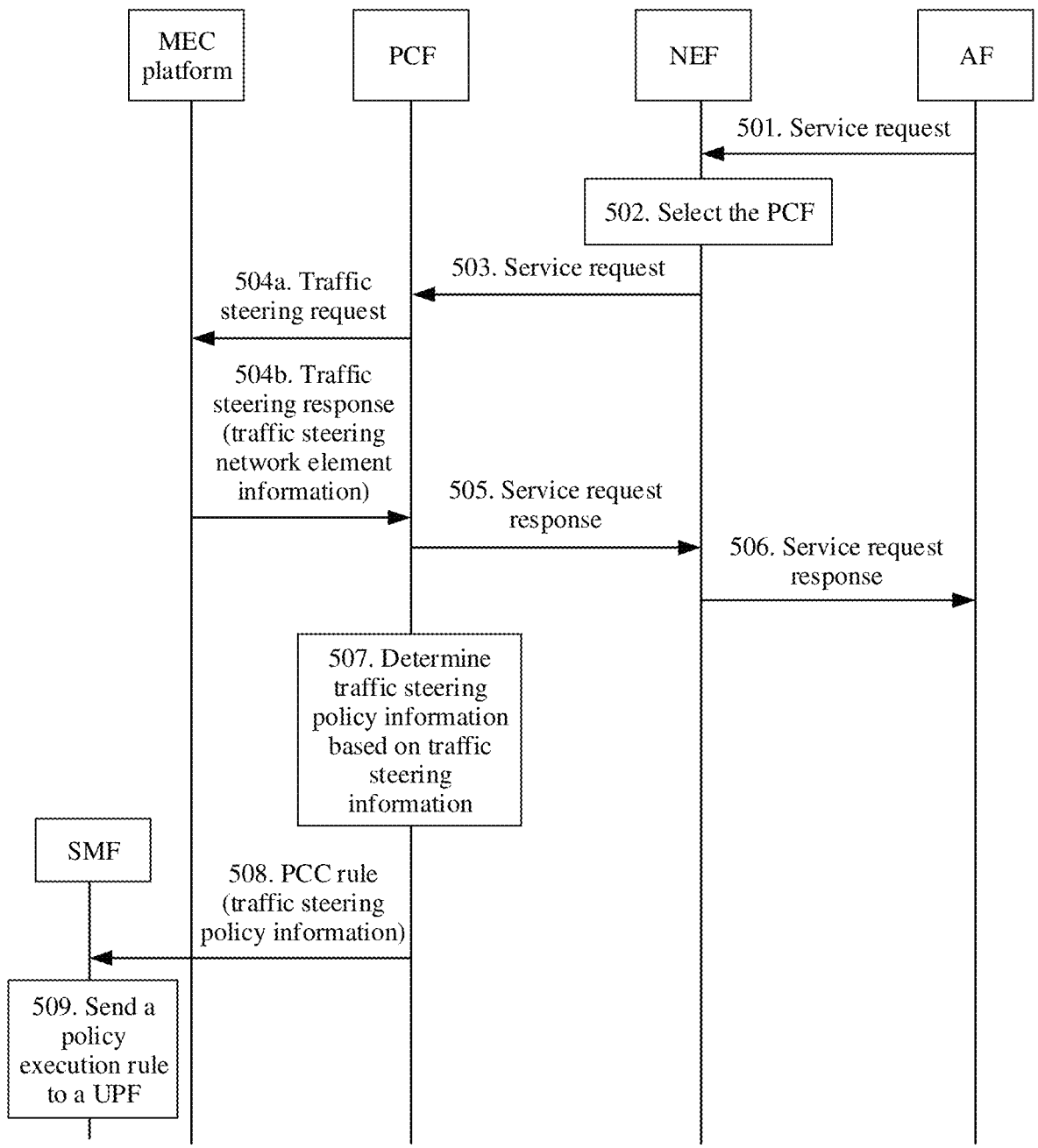
FIG. 5 is a schematic flowchart of another communication method according to this application.

FIG. 5 is a schematic flowchart of another communication method according to this application. This embodiment is a specific implementation of the embodiment of FIG. 4B.

The method includes the following steps.

Before service transmission, an AF initiates a service authorization request procedure to a 5G core (5GC) network. The AF may negotiate with a PCF by using an NEF over a service policy, or the AF directly interacts with the PCF to negotiate over a policy. The following procedure is described by using an example in which the AF negotiates with the PCF by using the NEF over a policy.

Step 501. The AF sends a service request to the NEF. Correspondingly, the NEF may receive the service request.

The service request includes an AF identifier, a UE address, and service information.

Optionally, the service request may further include a traffic steering requirement.

Optionally, the service request may further include location information corresponding to a service.

Step 502. The NEF selects a serving PCF based on the UE address.

Step 503. The NEF sends the service request to the PCF. Correspondingly, the PCF may receive the service request.

The service request includes the AF identifier, the UE address, and the service information.

If the service request in step 501 carries the traffic steering requirement, the service request in step 503 also includes the traffic steering requirement.

Step 504*a*. The PCF determines, based on the service request, to send a traffic steering request to an EC platform. Correspondingly, the EC platform may receive the traffic steering request.

In an implementation method, if the service request in step 503 includes a traffic steering requirement, the PCF determines, based on the traffic steering requirement, to initiate a traffic steering request to an EC platform, where the traffic steering request includes the traffic steering requirement.

In another implementation method, if the service request in step 503 does not include a traffic steering requirement, the PCF may determine, based on service information in the service request, to initiate a traffic steering request to an EC platform, where the traffic steering request includes the service information. Alternatively, the PCF determines, based on the service information, to initiate a traffic steering request to the EC platform, and determines a traffic steering requirement based on the service information, where the traffic steering request includes the traffic steering requirement.

Optionally, the traffic steering request sent by the PCF to the EC platform may further include the location information corresponding to the service. It should be noted that, if the location information is not included in the service request in step 501, the location information may be determined by the PCF based on the request of the AF. Specifically, the PCF may obtain the location information corresponding to the service from a UDR or locally obtain the location information corresponding to the service based on the request of the AF. Alternatively, the location information is determined by the PCF based on location information of UE. Specifically, the location information of the UE may be location information that is of the UE and that is provided by an SMF or an AMF.

Step 504*b*. The EC platform sends a traffic steering response to the PCF. Correspondingly, the PCF may receive the traffic steering response.

The traffic steering response includes traffic steering network element information.

In an implementation method, if the traffic steering request in step 504*a* carries the traffic steering requirement, the EC platform determines traffic steering network element information based on the traffic steering requirement. For example, if the traffic steering requirement is that service function 1 (video acceleration) and service function 2 (video compression) need to be performed, a network element supporting the video acceleration function and a network element supporting the video compression function are selected to form the traffic steering network element information. Further, the traffic steering network element information may alternatively be determined with reference to load information of a service function. For example, if service function network element 1, service function network element 2, and service function network element 3 are all network elements having the video acceleration function, and load of service function network element 1 and load of service function network element 2 are heavy, service function network element 3 is selected. Further, the traffic steering network element information may alternatively be determined with reference to capability information of a service function. For example, if both service function network element 1 and service function network element 2 are network elements having the video acceleration function, and service function network element 1 supports IPv6 segment routing (SRV6), but service function network element 2 does not support SRV6 or service function network element 2 supports a network service header (NSH), service function network element 2 may be selected.

In another implementation method, if the traffic steering request in step 504a carries the service information, the EC platform determines the traffic steering requirement based on the service information, and then determines traffic steering network element information based on the traffic steering requirement. For example, when the service information indicates that a service is a video service, it is determined that the traffic steering requirement is that a service function set {video acceleration, video compression} needs to be performed, and then the traffic steering network element information is determined based on the traffic steering requirement {video acceleration, video compression}. For details, refer to the foregoing method descriptions.

Further, if the traffic steering request in step 504a carries the location information corresponding to the service, the EC platform may alternatively determine the traffic steering network element information with reference to the location information corresponding to the service. Specifically, the EC platform determines the traffic steering network element information based on the location information corresponding to the service and location information of each service function network element.

Optionally, further, the traffic steering network element information includes the location information.

Step 505. The PCF sends a service request response to the NEF. Correspondingly, the NEF may receive the service request response.

Step 506. The NEF sends the service request response to the AF. Correspondingly, the AF may receive the service request response.

Step 507. The PCF determines traffic steering policy information based on the traffic steering network element information.

To be specific, the PCF determines an execution sequence of service function network elements in the traffic steering network element information based on the service information or the traffic steering requirement, to obtain the traffic steering policy information.

Optionally, if the traffic steering network element information includes the location information, the PCF selects service function network elements based on the location information, and determines a sequence in which service data passes through the service function network elements. Specifically, the PCF selects a corresponding service function network element based on the location information of the service. Alternatively, the PCF selects a corresponding service function network element based on the location information of the UE.

Further, the PCF includes the traffic steering policy information in location information. The location information is used to indicate a location of a traffic steering or a location of a service function network element.

Step 508. The PCF generates a PCC rule including the traffic steering policy information, and sends the PCC rule to the SMF. Correspondingly, the SMF may receive the PCC rule.

Step 509. The SMF generates an execution rule based on the traffic steering policy information, and sends the execution rule to a UPF at a corresponding location. Correspondingly, the UPF may receive the execution rule.

The UPF may perform traffic steering control on the service based on the traffic steering policy information.

Optionally, the SMF may further select UPF 1 based on the traffic steering policy information, and send a traffic steering execution rule to UPF 1. Specifically, UPF 1 is selected based on the location information in the traffic steering policy information, and the traffic steering execution rule is sent to UPF 1. In other words, one traffic steering may be executed at different UPFs (for example, the UPF and UPF 1).

It should be noted that there is no strict limitation on an execution sequence between step 505 and step 506, and step 507 to step 509.

In this embodiment of the present invention, the PCF dynamically determines the traffic steering policy information of the service based on the request of the AF, and activates a corresponding traffic steering policy, so that a network can establish a traffic steering on demand based on a service request, and functional entities that execute the traffic steering at different moments may be different.

Figure 6:
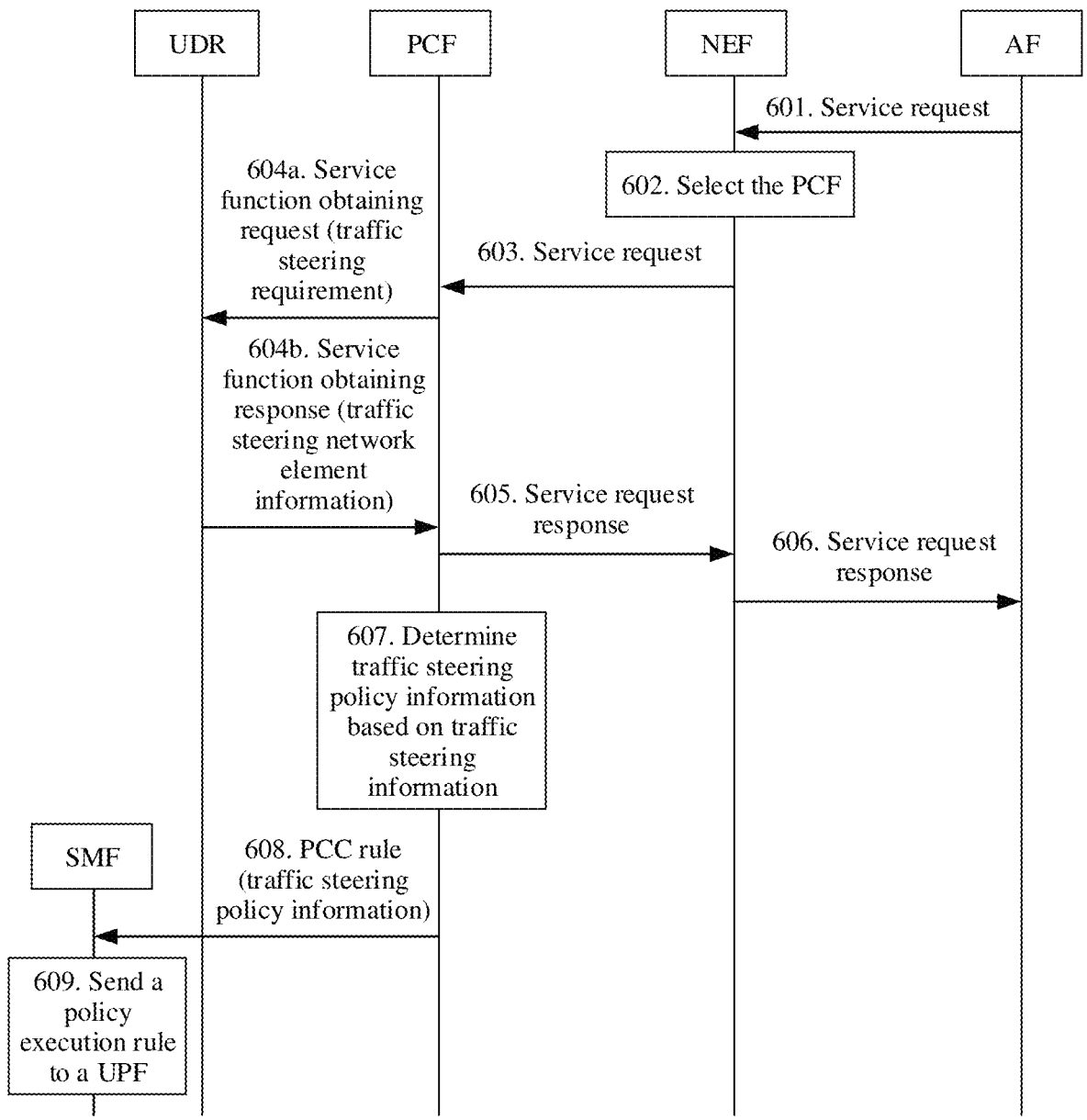
FIG. 6 is a schematic flowchart of another communication method according to this application.

FIG. 6 is a schematic flowchart of another communication method according to this application. This embodiment is a specific implementation of the embodiment of FIG. 4B.

A main difference between this embodiment and the embodiment of FIG. 5 lies in that, in the embodiment of FIG. 5, the PCF requests to obtain the traffic steering network element information from the EC platform, while in the embodiment of FIG. 6, the PCF requests to obtain the traffic steering network element information from the UDR.

The method includes the following steps.

Before service transmission, an AF sends a service authorization request procedure to a 5GC. The AF may negotiate with a PCF by using an NEF over a service policy, or the AF directly interacts with the PCF to negotiate over a policy. The following procedure is described by using an example in which the AF negotiates with the PCF by using the NEF over a policy.

Step 601 to step 603 are the same as step 501 to step 503 in the embodiment of FIG. 5. For details, refer to the foregoing descriptions.

Step 604a. The PCF determines, based on a service request, to send a traffic steering request to the UDR. Correspondingly, the UDR may receive the traffic steering request.

In an implementation method, if the service request in step 603 includes a traffic steering requirement, the PCF determines, based on the traffic steering requirement, to initiate a traffic steering request to the UDR, where the traffic steering request includes the traffic steering requirement.

In another implementation method, if the service request in step 603 does not include a traffic steering requirement, the PCF determines, based on service information, to initiate a traffic steering request to the UDR, and determines the traffic steering requirement based on the service information, where the traffic steering request includes the traffic steering requirement.

Optionally, the traffic steering request sent by the PCF to the UDR may further include location information, for example, DNAI.

Optionally, if the PCF locally includes the traffic steering network element information (for example, the PCF has obtained the traffic steering network element information from the UDR before the procedure), steps 604a and 604b are skipped, that is, the traffic steering network element information does not need to be obtained from the UDR.

Step 604b. The UDR sends a service function obtaining response to the PCF. Correspondingly, the PCF may receive the service function obtaining response.

The UDR determines the traffic steering network element information based on the traffic steering requirement, and the service function obtaining response includes the traffic steering network element information. For example, if the traffic steering requirement is that service function 1 (video acceleration) and service function 2 (video compression) need to be performed, a network element supporting the video acceleration function and a network element supporting the video compression function are selected to form the traffic steering network element information.

Further, if the traffic steering request in step 604a carries location information corresponding to a service, the UDR may further determine the traffic steering network element information based on the location information corresponding to the service. Specifically, the UDR determines the traffic steering network element information based on the location information corresponding to the service and location information of each service function network element.

Further, optionally, the service function obtaining response sent by the UDR to the PCF includes location information, and the location information is used to indicate a location of a traffic steering network element.

Step 605 to step 609 are the same as step 505 to step 509 in the embodiment of FIG. 5. For details, refer to the foregoing descriptions.

Based on this embodiment, the PCF dynamically obtains the traffic steering network element information from the UDR based on the request of the AF, and the PCF determines the traffic steering policy information based on the traffic steering network element information, and activates a corresponding traffic steering policy, so that a network can establish a traffic steering on demand based on a service request, and functional entities that execute the traffic steering at different moments may be different.

Figure 7:
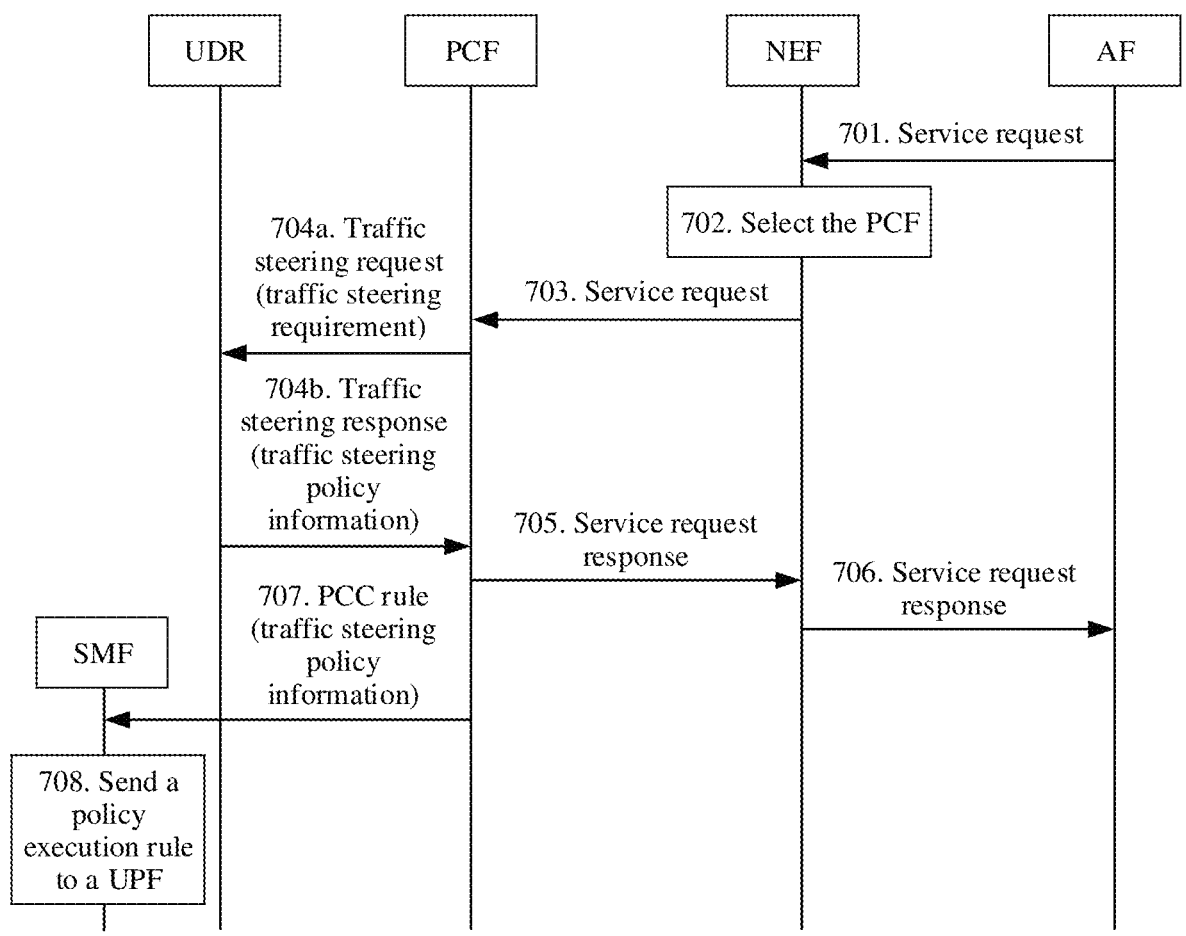
FIG. 7 is a schematic flowchart of another communication method according to this application.

FIG. 7 is a schematic flowchart of another communication method according to this application. This embodiment is a specific implementation of the embodiment of FIG. 4A.

A main difference between this embodiment and the embodiment of FIG. 6 lies in that, in the embodiment of FIG. 6, the PCF requests to obtain the traffic steering network element information from the UDR, that is, the UDR stores the traffic steering network element information, while in the embodiment of FIG. 7, the PCF requests to obtain the traffic steering policy information from the UDR, that is, the UDR stores the traffic steering policy information.

The method shown in FIG. 7 includes the following steps.

An AF sends a service authorization request procedure to a 5GC at any moment. The AF may negotiate with a PCF by using an NEF over a policy, or the AF directly interacts with the PCF to negotiate over a policy. The following procedure is described by using an example in which the AF negotiates with the PCF by using the NEF over a policy.

Step 701 to step 703 are the same as step 601 to step 603 in the embodiment of FIG. 6. For details, refer to the foregoing descriptions.

Step 704a. The PCF determines, based on a service request, to send a traffic steering request to the UDR. Correspondingly, the UDR may receive the traffic steering request.

In an implementation method, if the service request in step 703 includes a traffic steering requirement, the PCF determines, based on the traffic steering requirement, to initiate a traffic steering request to the UDR, where the traffic steering request includes the traffic steering requirement.

In another implementation method, if the service request in step 703 does not include a traffic steering requirement, the PCF determines, based on service information, to initiate a traffic steering obtaining request to the UDR, and determines the traffic steering requirement based on the service information, where the traffic steering obtaining request includes the traffic steering requirement.

In another implementation method, if determining, based on a request sent by an NEF, that traffic steering information needs to be obtained, the PCF sends a traffic steering request to the UDR, where the traffic steering request is used by the UDR to send stored traffic steering policy information to the PCF.

Optionally, the traffic steering request is further used to request the UDR to send traffic steering policy information negotiated by another AF.

Optionally, the traffic steering request sent by the PCF to the UDR may further include location information, for example, DNAI.

Step 704b. The UDR sends a traffic steering response to the PCF. Correspondingly, the PCF may receive the traffic steering response.

The UDR determines the traffic steering policy information based on the traffic steering requirement, and the traffic steering response includes the traffic steering policy information.

Further, if the traffic steering request in step 704a carries location information corresponding to a service, the UDR may further determine the traffic steering policy information based on the location information corresponding to the service.

In another implementation method, the traffic steering policy information sent by the UDR to the PCF is all traffic steering policy information stored in the UDR. Optionally, the service policy information sent by the UDR to the PCF further includes traffic steering policy information negotiated by the another AF.

Step 705 to step 708 are the same as step 605, step 606, step 608, and step 609 in the embodiment of FIG. 6. For details, refer to the foregoing descriptions.

Based on this embodiment, the PCF dynamically obtains the traffic steering policy information from the UDR based on the request of the AF, and activates a corresponding traffic steering policy, so that a network can establish a traffic steering on demand based on a service request, and functional entities that execute the traffic steering at different moments may be different.

It should be noted that the UDR in the embodiment of FIG. 7 may be replaced with an EC platform, and an implementation method thereof is similar to the implementation method of the embodiment of FIG. 7. In addition to the implementation method described in FIG. 7, the implementation method of the UDR may further include: Before step 704a, the PCF selects an EC platform based on location information of a service or location information of UE, and sends a traffic steering request to the selected EC platform.

Figure 8:
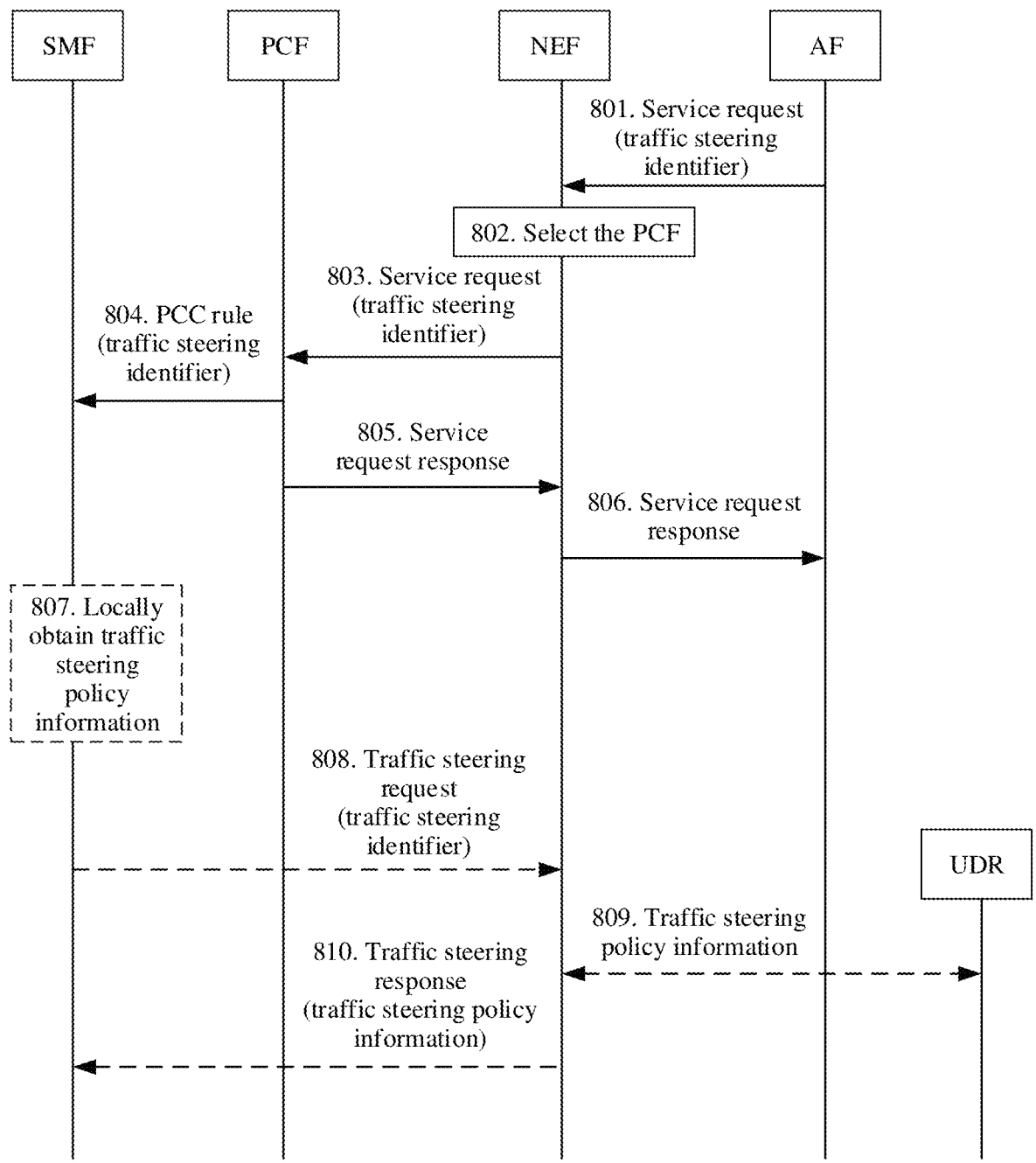
FIG. 8 is a schematic flowchart of another communication method according to this application.

FIG. 8 is a schematic flowchart of another communication method according to this application. This embodiment is a specific implementation of the embodiment of FIG. 4C.

A main difference between this embodiment and the embodiments of FIG. 5 to FIG. 7 lies in that, in the foregoing embodiments of FIG. 5 to FIG. 7, the service request received by the PCF from the AF carries the service information and/or the traffic steering requirement, and the PCF obtains the traffic steering policy information based on the service information or the traffic steering requirement, while in the embodiment of FIG. 8, the service request received by the PCF from the AF carries the traffic steering identifier, and the traffic steering identifier indicates one piece of traffic steering policy information negotiated between the AF and the PCF in advance. The PCF sends the traffic steering identifier to the SMF, so that the SMF obtains the traffic steering policy information based on the traffic steering identifier. For a traffic steering policy information negotiation method, refer to the embodiment shown in FIG. 9A and FIG. 9B or FIG. 10A and FIG. 10B.

The method shown in FIG. 8 includes the following steps.

Step 801. The AF sends a service request to an NEF. Correspondingly, the NEF may receive the service request.

The service request includes an AF identifier, a UE address, service information, and a traffic steering identifier.

Step 802. The NEF selects a serving PCF based on the UE address.

Step 803. The NEF sends the service request to the PCF. Correspondingly, the PCF may receive the service request.

The service request includes the AF identifier, the UE address, service information, and the traffic steering identifier.

Step 804. The PCF generates a PCC rule including the traffic steering identifier, and sends the PCC rule to the SMF. Correspondingly, the SMF may receive the PCC rule.

Step 805. The PCF sends a service request response to the NEF. Correspondingly, the NEF may receive the service request response.

Step 806. The NEF sends the service request response to the AF. Correspondingly, the AF may receive the service request response.

Step 807. The SMF locally obtains traffic steering policy information corresponding to the traffic steering identifier.

That is, when the SMF stores the traffic steering identifier and the traffic steering policy information corresponding to the traffic steering identifier, the SMF may locally obtain the corresponding traffic steering policy information based on the traffic steering identifier.

Step 808. The SMF sends a traffic steering request to the NEF. Correspondingly, the NEF may receive the traffic steering request.

The traffic steering request includes the traffic steering identifier.

Step 809. The NEF obtains, from the AF, the traffic steering policy information corresponding to the traffic steering identifier.

Step 810. The NEF sends a traffic steering response to the SMF. Correspondingly, the SMF may receive the traffic steering response.

The traffic steering response includes the traffic steering policy information.

It should be noted that either step 807 or step 808 to step 810 are performed. That is, either step 807 is performed, or step 808 to step 810 are performed. When the SMF locally stores the traffic steering policy information, step 807 is performed. When the SMF does not locally store the traffic steering policy information, step 808 to step 810 are performed.

In another implementation method, the embodiment shown in FIG. 8 may be extended to include the following steps: the foregoing step 801 to step 803.

Step 803a. The PCF generates a PCC rule including traffic steering policy information.

Step 804. The PCF sends the PCC rule to the SMF. Correspondingly, the SMF may receive the PCC rule.

The PCC rule includes the traffic steering policy information.

Step 805 and step 806 are performed. The procedure ends.

In this implementation solution, the PCF obtains, from a UDR based on the traffic steering identifier, the traffic steering policy information corresponding to the traffic steering identifier, includes the traffic steering policy information in the PCC rule, and sends the PCC rule to the SMF.

Based on any of the foregoing implementation solutions, after obtaining the traffic steering policy information, the SMF may generate an execution rule based on the traffic steering policy information, and send the execution rule to a corresponding UPF.

In this embodiment of the present invention, the SMF dynamically activates a corresponding traffic steering policy based on the request of the AF, so that a network can establish a traffic steering on demand based on a service request, and functional entities that execute the traffic steering at different moments may be different.

It should be noted that, in another implementation in the embodiment of FIG. 8, the AF may not provide the traffic steering identifier, and the PCF obtains traffic steering policy information or a traffic steering ID from the UDR based on service information or an AF ID. The traffic steering policy information is traffic steering policy information negotiated by the AF and the PCF before the procedure or a traffic steering ID corresponding to the traffic steering policy information. Further, the PCF may determine, based on location information corresponding to a service, traffic steering policy information corresponding to a specific location or a traffic steering ID corresponding to the traffic steering policy information. The location information corresponding to the service is provided by the AF, or determined by the PCF based on location information of UE provided by the SMF, or determined by the PCF based on an IP address.

It should be noted that, before the embodiment of FIG. 8, the PCF and the AF need to negotiate over the traffic steering policy information. The following describes two different traffic steering policy information negotiation methods. For details, refer to the embodiments shown in FIG. 9A and FIG. 9B and FIG. 10A and FIG. 10B. In a traffic steering policy information negotiation procedure, the AF may obtain the traffic steering identifier and the traffic steering policy information corresponding to the traffic steering identifier. In other words, the traffic steering identifier carried in the service request in step 801 in the foregoing embodiment of FIG. 8 is obtained based on the following method in the embodiment of FIG. 9A and FIG. 9B or FIG. 10A and FIG. 10B.

Figure 9A:
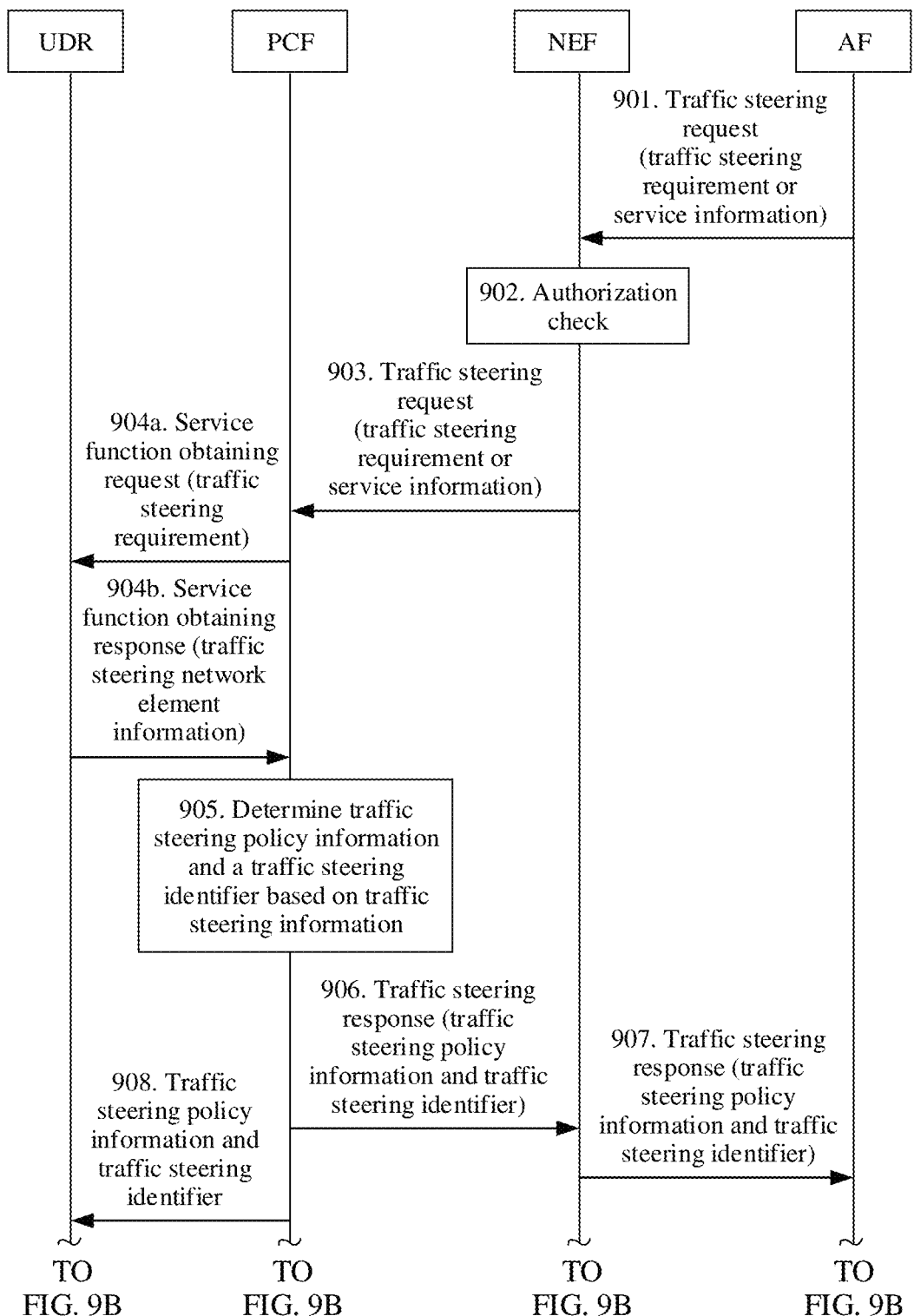
FIG. 9A and FIG. 9B are a schematic flowchart of another communication method according to this application.
Figure 9B:
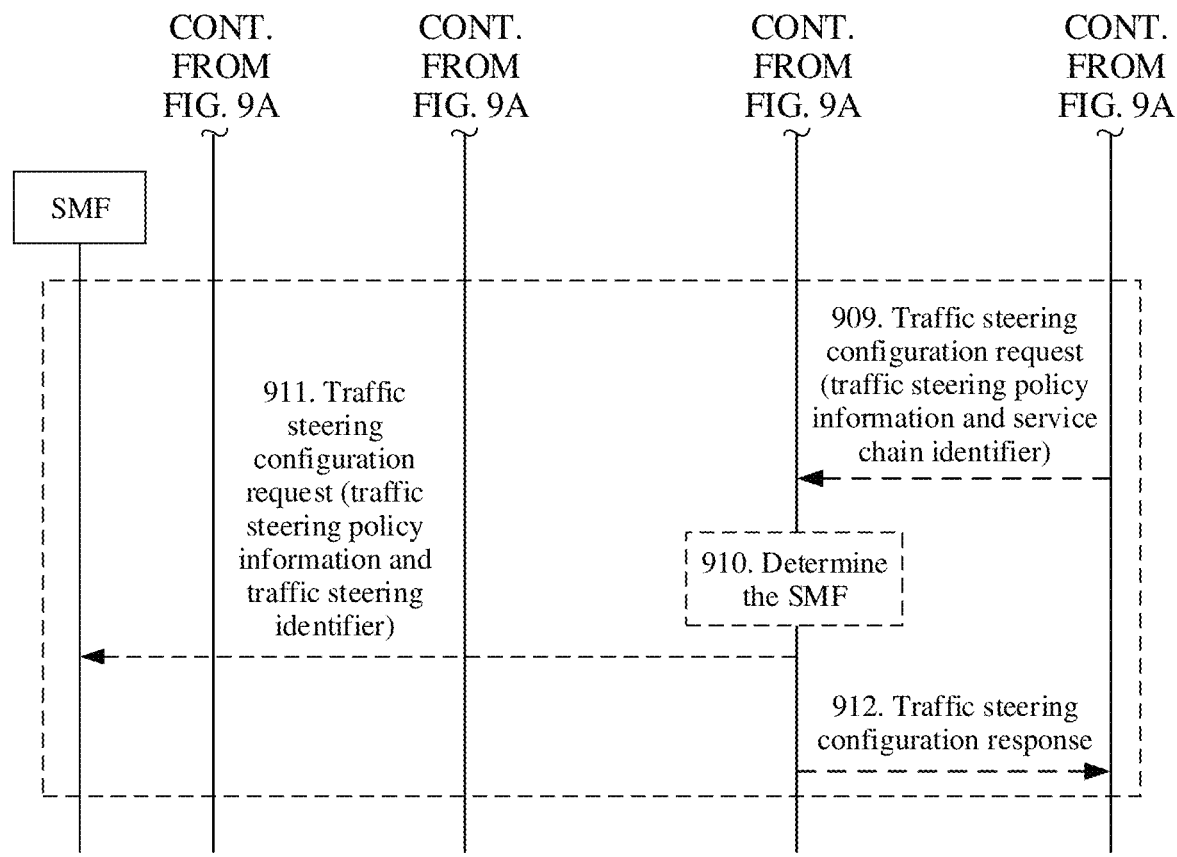

FIG. 9A and FIG. 9B are a schematic flowchart of a traffic steering policy information negotiation method according to this application. This embodiment is a specific implementation of negotiation method 1 in the embodiment of FIG. 4C. An AF may initiate a traffic steering negotiation procedure to a 5GC at any moment.

The method includes the following steps.

Step 901. The AF sends a traffic steering request to the NEF. Correspondingly, the NEF may receive the traffic steering request.

The traffic steering request includes an AF identifier and service information.

Optionally, the traffic steering request may further include location information, for example, DNAI.

Optionally, a traffic steering requirement is included. Step 902. The NEF performs an authorization check, and determines to authorize the AF to initiate the traffic steering request.

Step 903. The NEF sends the traffic steering request to a PCF. Correspondingly, the PCF may receive the traffic steering request.

The traffic steering request includes the AF identifier, and further includes the traffic steering requirement or the service information. If the traffic steering request in step 901 carries the traffic steering requirement, the service request in step 903 includes the traffic steering requirement. If the service request in step 901 carries the service information, the service request in step 903 includes the service information. Alternatively, if the service request in step 901 carries the service information, the service request in step 903 includes traffic steering requirement determined based on the service information.

If the service request in step 901 carries the location information, the service request in step 903 further includes the location information.

In a specific implementation method, the traffic steering request may be a service-oriented message, for example, an Npcf_ServiceChain request.

Step 904a and step 904b are the same as step 604a and step 604b in the embodiment of FIG. 6. For details, refer to the foregoing descriptions.

Step 905. The PCF determines traffic steering policy information and a traffic steering identifier based on traffic steering network element information in a service function obtaining response.

Step 906. The PCF sends a traffic steering response to the NEF. Correspondingly, the NEF may receive the traffic steering response.

The traffic steering response includes the traffic steering identifier and the traffic steering policy information.

Optionally, the PCF may determine one traffic steering identifier and corresponding traffic steering policy information, or determine a plurality of traffic steering identifiers and traffic steering policy information corresponding to each traffic steering identifier. Optionally, the traffic steering policy information includes the location information.

Step 907. The NEF sends the traffic steering response to the AF. Correspondingly, the AF may receive the traffic steering response.

The traffic steering response includes the traffic steering identifier and the traffic steering policy information.

Step 908. The PCF sends the traffic steering identifier and the traffic steering policy information to a UDR. Correspondingly, the NEF may receive the traffic steering identifier and the traffic steering policy information.

Step 908 may be performed in any step after step 905.

Optionally, after step 908, the following step 909 to step 912 may be further performed, to configure the traffic steering identifier and the traffic steering policy information in an SMF.

Step 909. The AF sends a traffic steering configuration request to the NEF. Correspondingly, the NEF may receive the traffic steering configuration request.

The traffic steering configuration request includes the traffic steering identifier and the traffic steering policy information.

It should be noted that the NEF selected by the AF herein may be different from an NEF used during policy negotiation.

Step 910. The NEF determines the SMF.

For example, the NEF determines the SMF based on the location information in the traffic steering policy information. Alternatively, the NEF determines all SMFs.

Step 911. The NEF sends a traffic steering configuration request to the SMF. Correspondingly, the SMF may receive the traffic steering configuration request.

The SMF herein is the SMF determined in step 910.

The traffic steering configuration request includes the traffic steering identifier and the traffic steering policy information.

The traffic steering configuration request may be, for example, an Nnef_servicechain configuration message.

Step 912. The NEF sends a traffic steering configuration response to the AF. Correspondingly, the AF may receive the traffic steering configuration response.

Based on this embodiment, a traffic steering policy information negotiation method is provided. The PCF may determine the traffic steering policy information and the traffic steering identifier, and then send the traffic steering policy information and the traffic steering identifier to a UDR for storage and send the traffic steering policy information and the traffic steering identifier to the AF. Before UE performs a service, the AF provides a traffic steering identifier for a network side to activate a corresponding traffic steering policy, so that a third party can request and activate traffic steering control on demand.

In an implementation method, in step 908, the information stored by the PCF in the UDR may further include service information. The service information is used to indicate a service that accepts control of the traffic steering policy information. Specifically, the information may include, for example, an application ID, service filter information (an IP address, or a media access control (MAC) address), a service type, or other information used to identify a service. Based on this implementation, when the embodiment of FIG. 9A and FIG. 9B is combined with the embodiment of FIG. 8, in step 801, the AF may include the service information rather than the traffic steering identifier in the service request. The PCF may obtain the corresponding traffic steering identifier from the UDR based on the service information.

Figure 10A:
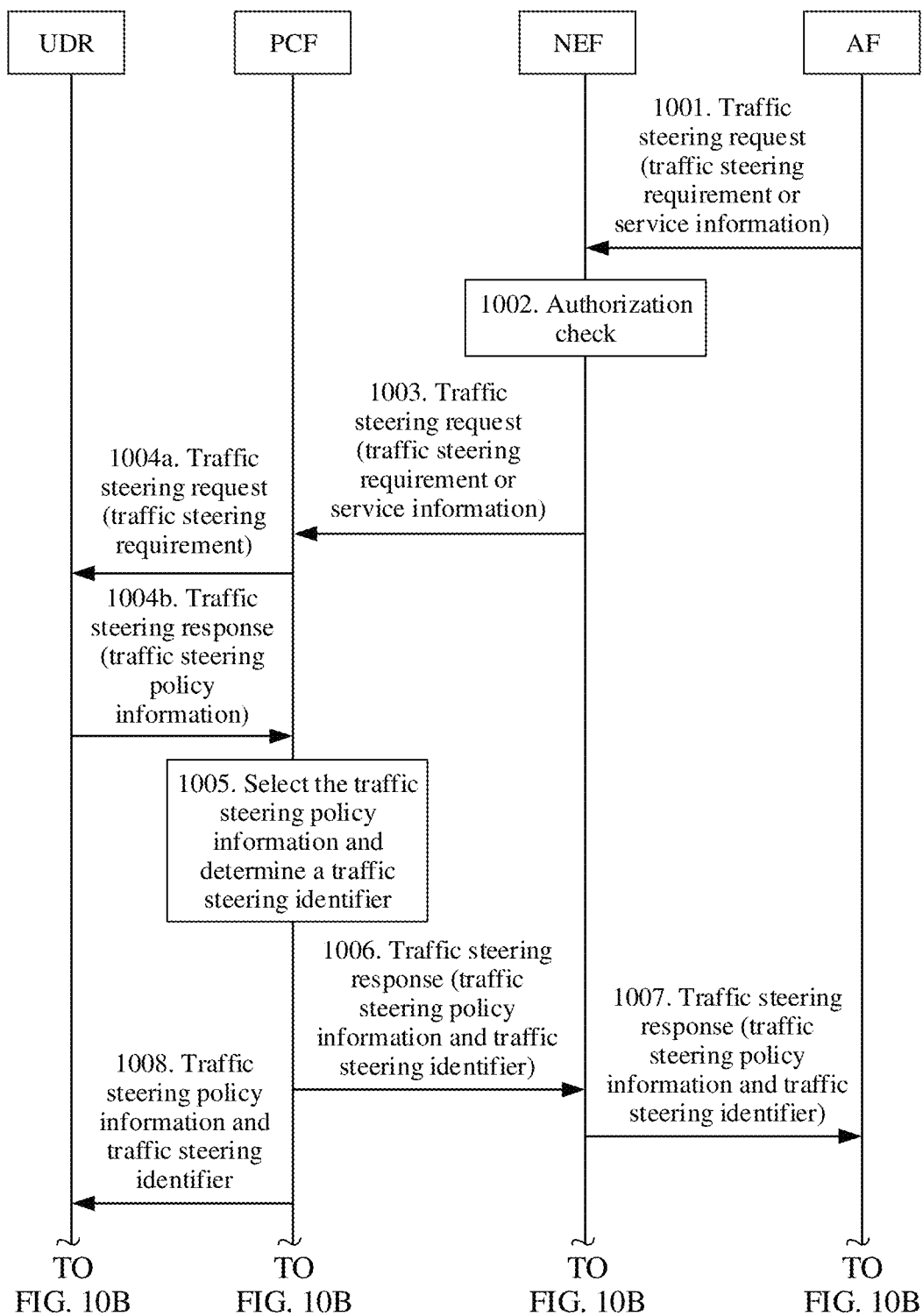
FIG. 10A and FIG. 10B are a schematic flowchart of another communication method according to this application.
Figure 10B:
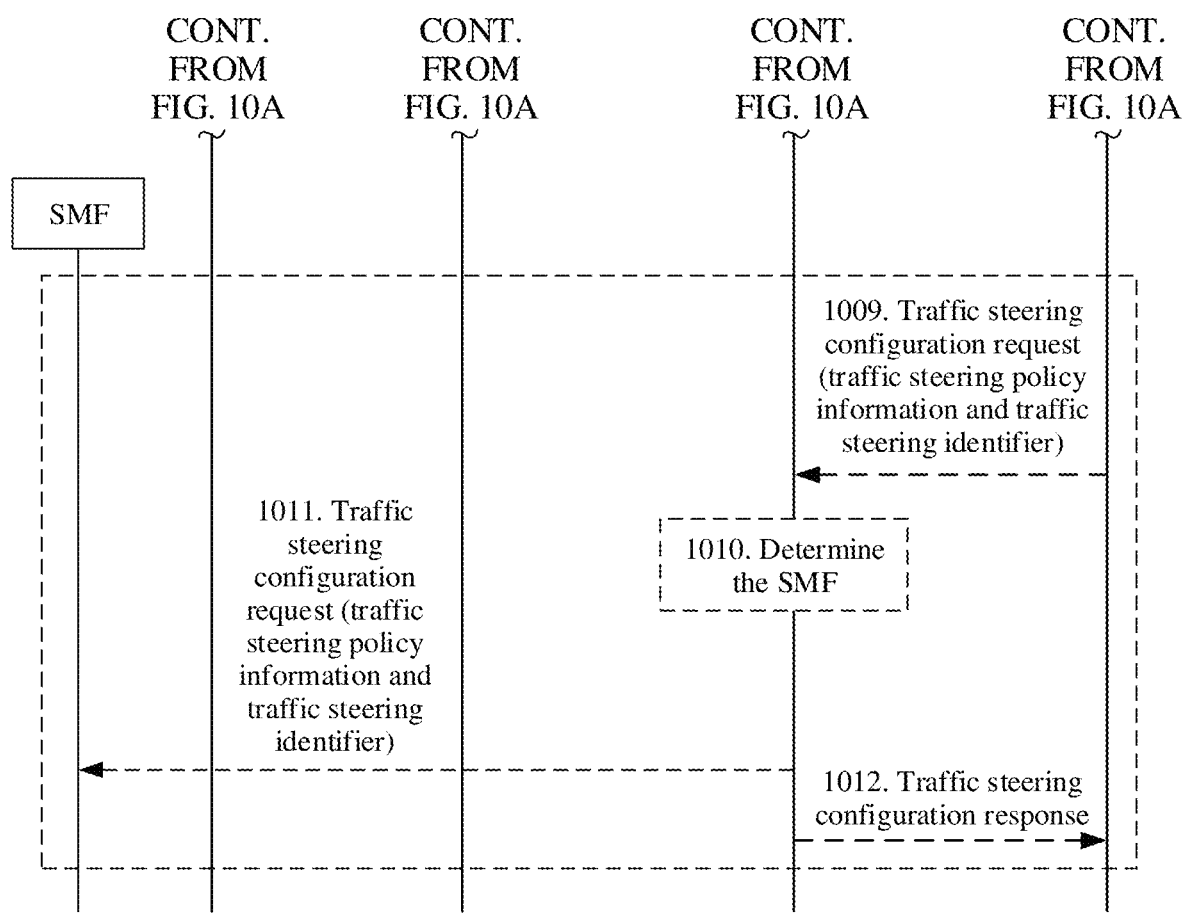

FIG. 10A and FIG. 10B is a schematic flowchart of another traffic steering policy information negotiation method according to this application. An AF may initiate a traffic steering negotiation procedure to a 5GC at any moment. This embodiment is a specific implementation of negotiation method 2 in the embodiment of FIG. 4C.

A main difference between this embodiment and the embodiment shown in FIG. 9A and FIG. 9B lies in that, in the embodiment of FIG. 9A and FIG. 9B, the UDR stores the traffic steering network element information, and therefore the PCF obtains the traffic steering network element information from the UDR, while in the embodiment of FIG. 10A and FIG. 10B, the UDR stores the traffic steering policy information, and therefore the PCF obtains the traffic steering policy information from the UDR.

The method includes the following steps.

Step 1001 to step 1003 are the same as step 901 to step 903 in the embodiment of FIG. 9A. For details, refer to the foregoing descriptions.

Step 1004a. The PCF determines, based on a service request, to send a traffic steering request to a UDR. Correspondingly, the UDR may receive the traffic steering request.

In an implementation method, if the service request in step 1003 includes a traffic steering requirement, the PCF determines, based on the traffic steering requirement, to initiate the traffic steering request to the UDR, where the traffic steering request includes the traffic steering requirement.

In another implementation method, if the service request in step 1003 does not include a traffic steering requirement, the PCF determines, based on service information, to initiate the traffic steering request to the UDR, and determines the traffic steering requirement based on the service information, where the traffic steering request includes the traffic steering requirement.

In another implementation method, the PCF may determine, based on a traffic steering request message sent by an NEF, to send the traffic steering request to the UDR, where the request is used to obtain the traffic steering policy information stored in the UDR, and optionally, obtain traffic steering policy information corresponding to other services.

Optionally, the traffic steering request sent by the PCF to the UDR may further include location information, for example, DNAI.

Step 1004b. The UDR sends a traffic steering response to the PCF. Correspondingly, the PCF may receive the traffic steering response.

The UDR determines the traffic steering policy information based on the traffic steering requirement, and the traffic steering response includes the traffic steering policy information. Further, if the traffic steering request in step 1004a carries the location information, the UDR may further determine the traffic steering policy information based on the location information.

It should be noted that herein the UDR returns, to the PCF, all traffic steering policy information that meets the traffic steering requirement, and then the PCF further selects one or more pieces of traffic steering policy information from the traffic steering policy information.

Alternatively, if the PCF does not include the traffic steering requirement in step 1004a, the UDR returns all stored traffic steering policy information. Optionally, the traffic steering response message further includes traffic steering policy information of other services. When the traffic steering policy information of the other services is included, traffic steering identifiers corresponding to the traffic steering policy information may be further provided. If the traffic steering requirement is not included and the location information is included, the UDR returns all traffic steering policy information of corresponding locations. Optionally, the traffic steering response message further includes traffic steering policy information of other services at a corresponding location.

Step 1005. The PCF selects one or more pieces of traffic steering policy information from the received traffic steering policy information, and determines traffic steering identifiers of at least one piece of traffic steering policy information.

It should be noted that one piece of traffic steering policy information may include a plurality of service subchains. Service function network elements in one service subchain are located at a same location, in other words, service function network elements in one service subchain correspond to same location information. Service function network elements in different service subchains are located at different locations.

Specifically, if the PCF receives traffic steering policy information that is not filtered by the UDR (that is, the PCF does not include the traffic steering requirement in step 1004a), the PCF may further filter, from the received traffic steering policy information based on the service information or the traffic steering requirement, traffic steering policy information corresponding to the service information or the traffic steering requirement, and determine at least one corresponding traffic steering identifier.

Step 1006 to step 1012 are the same as step 906 to step 912 in the embodiment of FIG. 9A and FIG. 9B. For details, refer to the foregoing descriptions.

Based on this embodiment, a traffic steering policy information negotiation method is provided. The PCF may determine the traffic steering policy information and the traffic steering identifier, and then send the traffic steering policy information and the traffic steering identifier to a UDR for storage and send the traffic steering policy information and the traffic steering identifier to the AF. Before UE performs a service, the AF provides a traffic steering identifier or service information for a network side to activate a corresponding traffic steering policy, so that a third party can request and activate traffic steering control on demand.

In the embodiments shown in FIG. 5 to FIG. 10A and FIG. 10B, the UDR stores the traffic steering network element information or the traffic steering policy information. The traffic steering network element information or the traffic steering policy information stored in the UDR may be preconfigured, or may be stored through a procedure shown in FIG. 11 below.

Figure 11:
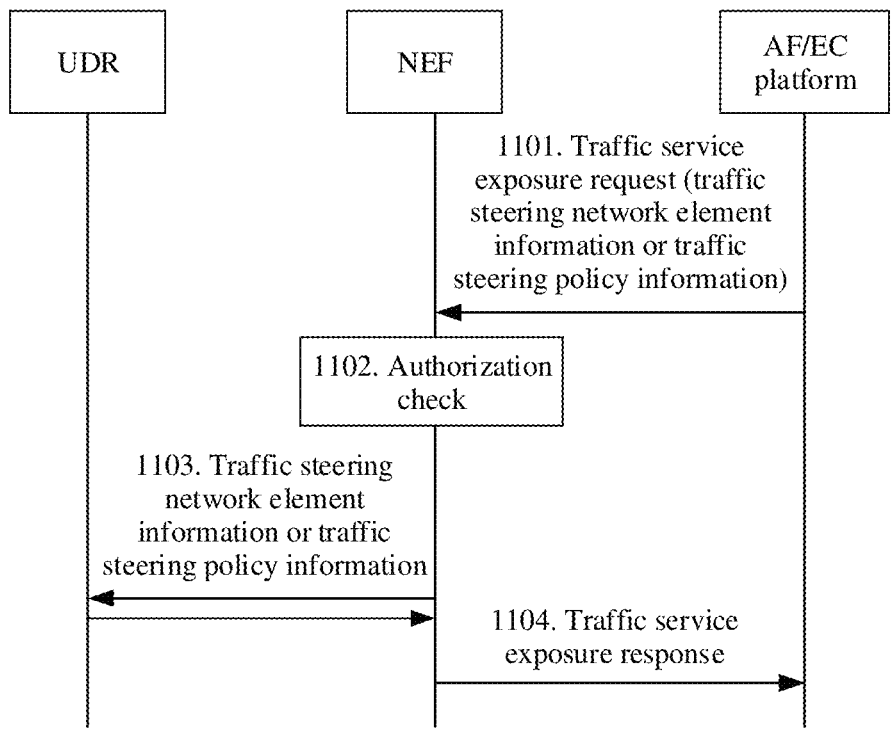
FIG. 11 is a schematic flowchart of another communication method according to this application.

FIG. 11 shows a method for storing traffic steering network element information or traffic steering policy information to a UDR according to this application. The method includes the following steps.

Step 1101. An AF/EC platform sends a traffic service exposure request to an NEF. Correspondingly, the NEF may receive the traffic service exposure request.

The traffic service exposure request includes traffic steering network element information or traffic steering policy information.

It should be noted that the traffic service exposure request herein may be replaced with another request message.

Step 1102. The NEF performs authorization, that is, determines to authorize the AF to initiate a request.

Step 1103. The NEF stores the traffic steering network element information or the traffic steering policy information to a UDR through an Nudr_DM creation procedure.

When the traffic service exposure request in step 1101 includes the traffic steering network element information, the traffic steering network element information is sent to the UDR in step 1103.

When the traffic service exposure request in step 1101 includes the traffic steering policy information, the traffic steering policy information is sent to the UDR in step 1103.

Step 1104. The NEF sends a traffic service exposure response to the AF/EC platform.

Based on this embodiment, a method for providing, by the AF/EC platform, a traffic steering capability (that is, the traffic steering network element information or the traffic steering policy information) for a 5GC is provided, so that a carrier can use a traffic steering capability of a third party, thereby dynamically obtaining traffic service information. Optionally, in this embodiment, the NEF may send the traffic steering network element information or the traffic steering policy information to the PCF, and the PCF locally stores the information. Alternatively, the PCF further stores the traffic steering network element information or the traffic steering policy information in the UDR. If only one PCF is deployed on the network, the information is stored in the PCF.

The foregoing mainly describes, from a perspective of interaction between network elements, solutions provided in this application. It may be understood that, to implement the foregoing functions, each network element includes a corresponding hardware structure and/or software module for implementing each function. A person skilled in the art should be easily aware that with reference to the units and algorithm steps in the examples described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 12:
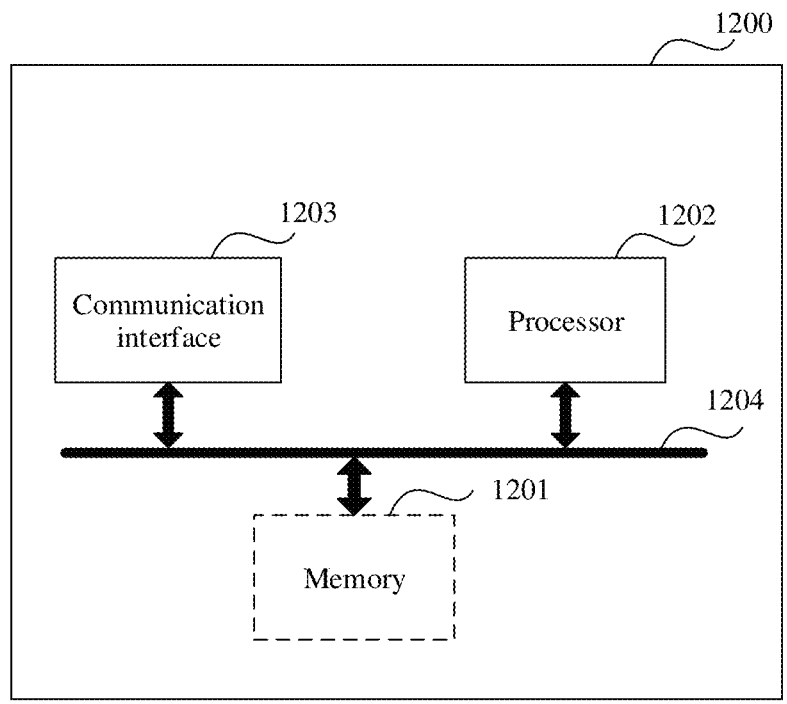
FIG. 12 is a schematic diagram of a communication apparatus according to this application.

FIG. 12 is a schematic diagram of a communication apparatus according to this application. The apparatus may be the policy control network element or the session management network element in the foregoing embodiments. The apparatus 1200 includes a processor 1202 and a communication interface 1203. Optionally, the apparatus 1200 may further include a memory 1201. Optionally, the apparatus 1200 may further include a communication line 1204. The communication interface 1203, the processor 1202, and the memory 1201 may be connected to each other through the communication line 1204. The communication line 1204 may be a peripheral component interconnect (PCI for short) bus, an extended industry standard architecture (EISA for short) bus, or the like. The communication line 1204 may be classified into an address bus, a data bus, a control bus, and the like. For ease of representation, only one thick line is used to represent the bus in FIG. 12, but this does not mean that there is only one bus or only one type of bus.

The processor 1202 may be a general-purpose central processing unit (CPU), a microprocessor, an application-specific integrated circuit (ASIC), or one or more integrated circuits configured to control program execution in the solutions of this application.

The communication interface 1203 is configured to communicate with another device or a communication network, such as an Ethernet, a RAN, a wireless local area network (WLAN), or a wired access network by using any apparatus such as a transceiver.

The memory 1201 may be a read-only memory (ROM) or another type of static storage device that can store static information and instructions, or a random access memory (RAM) or another type of dynamic storage device that can store information and instructions. The memory 1201 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 1201 is not limited thereto. The memory may exist independently and is connected to the processor through the communication line 1204. Alternatively, the memory may be integrated with the processor.

The communication interface 1203 is configured to receive code instructions and transmit the code instructions to the processor 1202, and the processor 1202 controls execution of the code instructions, to implement the communication method provided in the method embodiments of this application. The code instructions may be from the memory 1201, or may be obtained from another place.

The memory 1201 is configured to store computer-executable instructions for executing the solutions of this application, and the processor 1202 controls execution of the computer-executable instructions. The processor 1202 is configured to execute the computer-executable instructions stored in the memory 1201, to implement the communication method provided in the foregoing embodiments of this application.

Optionally, when the apparatus 1200 is a chip, the function/implementation process of the communication interface 1203 may alternatively be implemented through a pin, a circuit, or the like. Optionally, when the apparatus 1200 is a chip, the memory may be a storage unit in the chip, for example, a register or a cache. Certainly, when the apparatus 1200 is a chip, the memory may alternatively be a storage unit located outside the chip.

Optionally, the computer-executable instructions in this embodiment of this application may also be referred to as application program code. This is not specifically limited in this embodiment of this application.

Figure 13:
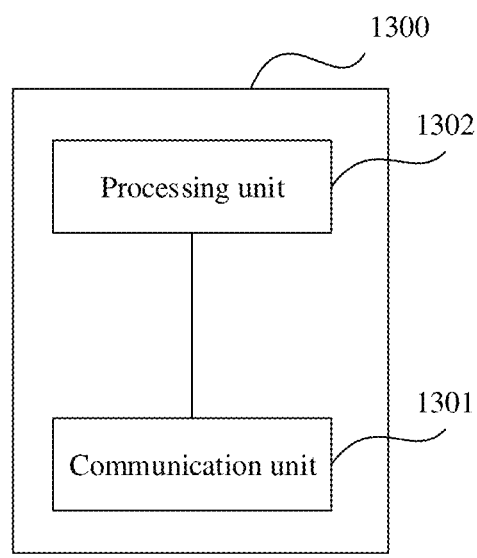
FIG. 13 is a schematic diagram of another communication apparatus according to this application.

FIG. 13 is a possible example block diagram of a communication apparatus according to this application. The apparatus 1300 may exist in a form of software or hardware. The apparatus 1300 may include a communication unit 1301 and a processing unit 1302. In an implementation, the communication unit 1301 may include a receiving unit and a sending unit. The processing unit 1302 is configured to control and manage an action of the apparatus 1300. The communication unit 1301 is configured to support the apparatus 1300 in communicating with another network entity.

The processing unit 1302 may be a processor or a controller, for example, may be a CPU, a general-purpose processor, a digital signal processor (DSP), an ASIC, a field programmable gate array (FPGA) or another programmable logic device, a transistor logic device, or a hardware component, or any combination thereof. The processing unit may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communication unit 1301 is an interface circuit of the apparatus, and is configured to receive a signal from another apparatus or send information to another apparatus. For example, when the apparatus is implemented as a chip, the communication unit 1301 is an interface circuit that is of the chip and that is configured to receive a signal from another chip or apparatus, and/or an interface circuit configured to send a signal to another chip or apparatus.

The apparatus 1300 may be the policy control network element or the session management network element in the foregoing embodiments, or may be a chip used in the policy control network element or the session management network element. For example, when the apparatus 1300 is the policy control network element or the session management network element, the processing unit 1302 may be, for example, a processor, and the communication unit 1301 may be, for example, a transmitter and/or a receiver. Optionally, the transmitter and the receiver may include a radio frequency circuit, and the storage unit may be, for example, a memory. For example, when the apparatus 1300 is the chip used in the policy control network element or the session management network element, the processing unit 1302 may be, for example, a processor, and the communication unit 1301 may be, for example, an input/output interface, a pin, or a circuit. The processing unit 1302 may execute computer-executable instructions stored in the storage unit. Optionally, the storage unit is a storage unit in the chip, such as a register or a cache. Alternatively, the storage unit may be a storage unit that is located outside the chip and that is in the policy control network element or the session management network element. The storage unit is, for example, a ROM, another type of static storage device that can store static information and instructions, or a RAM.

In a first solution, the communication unit 1301 is configured to receive first information, where the first information is service information or a traffic steering requirement, and the traffic steering requirement includes at least one service function. The processing unit 1302 is configured to obtain first traffic steering policy information from a first network element based on the first information, where the first traffic steering policy information includes at least one piece of traffic steering policy information, and the traffic steering policy information is used to indicate network elements corresponding to the at least one service function and a sequence in which service data passes through the network elements corresponding to the at least one service function.

In a possible implementation method, the first information is the traffic steering requirement. That the processing unit 1302 is configured to obtain the first traffic steering policy information from the first network element based on the first information specifically includes: sending the traffic steering requirement to the first network element by using the communication unit 1301; and receiving, from the first network element by using the communication unit 1301, the first traffic steering policy information corresponding to the traffic steering requirement.

In a possible implementation method, the first information is the service requirement. That the processing unit 1302 is configured to obtain the first traffic steering policy information from the first network element based on the first information specifically includes: determining the traffic steering requirement based on the service information; sending the traffic steering requirement to the first network element by using the communication unit 1301; and receiving, from the first network element by using the communication unit 1301, the first traffic steering policy information corresponding to the traffic steering requirement.

In a possible implementation method, the communication unit 1301 is further configured to receive location information corresponding to a service. That the processing unit 1302 is configured to send the traffic steering requirement to the first network element specifically includes: sending the traffic steering requirement and the location information corresponding to the service to the first network element. That the processing unit 1302 is configured to receive, from the first network element, the first traffic steering policy information corresponding to the traffic steering requirement specifically includes: receiving, from the first network element, the first traffic steering policy information corresponding to the location information and the traffic steering requirement.

In a possible implementation method, the communication unit 1301 is further configured to receive location information corresponding to a service. The processing unit 1302 is further configured to determine second traffic steering policy information based on the first traffic steering policy information and the location information corresponding to the service, where the second traffic steering policy information includes location information corresponding to the second traffic steering policy information. The communication unit 1301 is configured to send the second traffic steering policy information to a session management network element.

In a possible implementation method, the communication unit 1301 is further configured to send the first traffic steering policy information or a traffic steering identifier corresponding to the first traffic steering policy information to a session management network element.

In a possible implementation method, the processing unit 1302 is further configured to determine third traffic steering policy information based on the first information and the first traffic steering policy information.

In a possible implementation method, the communication unit 1301 is further configured to receive location information corresponding to a service. That the processing unit 1302 is configured to determine the third traffic steering policy information based on the first information and the first traffic steering policy information specifically includes: determining the third traffic steering policy information based on the first information, the first traffic steering policy information, and the location information corresponding to the service, where the third traffic steering policy information includes location information corresponding to the third traffic steering policy information. The communication unit 1301 is further configured to send the third traffic steering policy information to a session management network element.

In a possible implementation method, the location information corresponding to the service is location information of a terminal device.

In a possible implementation method, the location information corresponding to the service is location information of service deployment, location information of a server that provides the service, or location information of a user plane that accesses the service.

In a second solution, the communication unit 1301 is configured to: receive a first message, where the first message includes first information, the first information is service information or a traffic steering requirement, and the traffic steering requirement includes at least one service function. The processing unit 1302 is configured to: obtain first traffic steering policy information from a first network element based on the first message, where the first traffic steering policy information includes at least one piece of traffic steering policy information, and the traffic steering policy information is used to indicate network elements corresponding to the at least one service function and a sequence in which service data passes through the network elements corresponding to the at least one service function; and determine second traffic steering policy information based on the first information and the first traffic steering policy information.

In a possible implementation method, the communication unit 1301 is further configured to receive location information corresponding to a service. That the processing unit 1302 is configured to obtain the first traffic steering policy information from the first network element based on the first message specifically includes: obtaining the first traffic steering policy information from the first network element based on the first message and the location information corresponding to the service.

In a possible implementation method, the first traffic steering policy information further includes location information corresponding to the first traffic steering policy information. The communication unit 1301 is further configured to receive location information corresponding to a service. That the processing unit 1302 is configured to determine second traffic steering policy information based on the first information and the first traffic steering policy information specifically includes: determining the second traffic steering policy information based on the first information, the location information corresponding to the service, and the first traffic steering policy information.

In a possible implementation method, the communication unit 1301 is further configured to send the second traffic steering policy information to a session management network element. Alternatively, the communication unit 1301 is further configured to send the second traffic steering policy information and location information to a session management network element.

In a possible implementation method, the communication unit 1301 is further configured to: send a traffic steering identifier corresponding to the second traffic steering policy information to a session management network element; or send a traffic steering identifier and location information corresponding to the second traffic steering policy information to a session management network element.

In a possible implementation method, the processing unit 1302 is further configured to allocate the traffic steering identifier corresponding to the second traffic steering policy information. Alternatively, the communication unit 1301 is further configured to receive the traffic steering identifier corresponding to the second service policy information from the first network element.

In a possible implementation method, the location information corresponding to the service is location information of a terminal device.

In a possible implementation method, the location information corresponding to the service is location information of service deployment, location information of a server that provides the service, or location information of a user plane that accesses the service.

In a third solution, a receiving unit is configured to: receive a traffic steering identifier from an application function network element, where the traffic steering identifier is used to indicate first traffic steering policy information, the first traffic steering policy information includes at least one piece of traffic steering policy information, and the traffic steering policy information is used to indicate network elements corresponding to at least one service function and a sequence in which service data passes through the network elements corresponding to the at least one service function. A sending unit is configured to send the traffic steering identifier or the first traffic steering policy information to a session management network element, where the traffic steering identifier is used to determine the first traffic steering policy information.

In a possible implementation method, the receiving unit is further configured to: receive first information from the application function network element, where the first information is service information or a traffic steering requirement, and the traffic steering requirement includes the at least one service function. The processing unit 1302 is configured to: obtain traffic steering network element information from a first network element based on the first information, where the traffic steering network element information includes the network elements corresponding to the at least one service function; and determine the first traffic steering policy information and/or the traffic steering identifier based on the traffic steering network element information. The sending unit is further configured to send the first traffic steering policy information and/or the traffic steering identifier to the application function network element.

In a possible implementation method, the receiving unit is further configured to receive first information, where the first information is service information or a traffic steering requirement, and the traffic steering requirement includes the at least one service function. The processing unit 1302 is configured to: obtain traffic steering network element information from a first network element based on the first information, where the traffic steering network element information includes the network elements corresponding to the at least one service function; and determine the first traffic steering policy information and/or the traffic steering identifier based on the traffic steering network element information and the first information. The sending unit is further configured to send the first traffic steering policy information and/or the traffic steering identifier to the application function network element.

In a possible implementation method, the receiving unit is further configured to receive a first message, where the first message includes first information, the first information is service information or a traffic steering requirement, and the traffic steering requirement includes the at least one service function. The processing unit 1302 is configured to: obtain traffic steering network element information from a first network element based on the first message, where the traffic steering network element information includes the network elements corresponding to the at least one service function; and determine the first traffic steering policy information and/or the traffic steering identifier based on the traffic steering network element information. The sending unit is further configured to send the first traffic steering policy information and/or the traffic steering identifier to the application function network element.

In a possible implementation method, the receiving unit is further configured to: receive first information from the application function network element, where the first information is service information or a traffic steering requirement, and the traffic steering requirement includes the at least one service function. The processing unit 1302 is configured to: obtain second traffic steering policy information from a first network element; and determine the first traffic steering policy information and/or the traffic steering identifier based on the second traffic steering policy information and the first information. The sending unit is further configured to send the first traffic steering policy information and/or the traffic steering identifier to the application function network element.

In a possible implementation method, the receiving unit is further configured to receive first information, where the first information is service information or a traffic steering requirement, and the traffic steering requirement includes the at least one service function. The processing unit 1302 is configured to obtain traffic steering policy information from a first network element based on the first information; and determine the first traffic steering policy information and/or the traffic steering identifier based on the traffic steering policy information. The sending unit is further configured to send the first traffic steering policy information and/or the traffic steering identifier to the application function network element.

In a possible implementation method, the receiving unit is further configured to receive a first message, where the first message includes first information, the first information is service information or a traffic steering requirement, and the traffic steering requirement includes the at least one service function. The processing unit 1302 is configured to: obtain second traffic steering policy information from a first network element based on the first message; and determine the first traffic steering policy information and/or the traffic steering identifier based on the second traffic steering policy information and the first information. The sending unit is further configured to send the first traffic steering policy information and/or the traffic steering identifier to the application function network element.

In a possible implementation method, the sending unit is further configured to send the traffic steering identifier and/or the first traffic steering policy information to a data storage network element.

In a fourth solution, the communication unit 1301 is configured to: receive first information, where the first information is service information or a traffic steering requirement, and the traffic steering requirement includes at least one service function. The processing unit 1302 is configured to: obtain traffic steering network element information from a first network element based on the first information, where the traffic steering network element information includes network elements corresponding to the at least one service function; and determine traffic steering policy information based on the traffic steering network element information, where the traffic steering policy information is used to indicate the network elements corresponding to the at least one service function and a sequence in which service data passes through the network elements corresponding to the at least one service function.

In a possible implementation method, the first information is the traffic steering requirement. That the processing unit 1302 is configured to obtain the traffic steering network element information from the first network element based on the first information specifically includes: sending the traffic steering requirement to the first network element by using the communication unit 1301; and receiving, from the first network element by using the communication unit 1301, the traffic steering network element information corresponding to the traffic steering requirement.

In a possible implementation method, the first information is the service information. That the processing unit 1302 is configured to obtain the traffic steering network element information from the first network element based on the first information specifically includes: determining the traffic steering requirement based on the service information; sending the traffic steering requirement to the first network element by using the communication unit 1301; and receiving, from the first network element by using the communication unit 1301, the traffic steering network element information corresponding to the traffic steering requirement.

In a possible implementation method, the first information is the service information, and the first network element is an EC platform. That the processing unit 1302 is configured to obtain the traffic steering network element information from the first network element based on the first information includes: sending the service information to the EC platform by using the communication unit 1301; and receiving, from the EC platform by using the communication unit 1301, the traffic steering network element information corresponding to the service information.

In a possible implementation method, the traffic steering network element information further includes location information of the network elements corresponding to the at least one service function. The communication unit 1301 is further configured to receive location information corresponding to a service. That the processing unit 1302 is configured to determine the traffic steering policy information based on the traffic steering network element information specifically includes: determining the traffic steering policy information based on the traffic steering network element information and the location information corresponding to the service, where the traffic steering policy information includes location information corresponding to a traffic steering network element.

In a possible implementation method, the communication unit 1301 is further configured to receive location information corresponding to a service. That the processing unit 1302 is configured to obtain the traffic steering network element information from the first network element based on the first information specifically includes: obtaining the traffic steering network element information from the first network element based on the first information and the location information corresponding to the service.

In a possible implementation method, the communication unit 1301 is further configured to send the traffic steering policy information to a session management network element, where the traffic steering policy information is used to generate a forwarding rule.

In a possible implementation method, the processing unit 1302 is specifically configured to determine the traffic steering policy information based on the first information and the traffic steering network element information.

In a fifth solution, the communication unit 1301 is configured to obtain traffic steering policy information, where the traffic steering policy information includes location information corresponding to the traffic steering policy information, and the traffic steering policy information is used to indicate network elements corresponding to at least one service function and a sequence in which service data passes through the network elements corresponding to the at least one service function. The processing unit 1302 is configured to: generate a forwarding rule based on the traffic steering policy information; and determine a user plane network element based on the location information. The communication unit 1301 is further configured to send the forwarding rule to the user plane network element.

In a possible implementation method, that the communication unit 1301 is configured to obtain the traffic steering policy information specifically includes: receiving, from a policy control network element, a traffic steering identifier corresponding to the traffic steering policy information; and obtaining the traffic steering policy information based on the traffic steering identifier.

In a possible implementation method, that the communications unit 1301 is configured to obtain the traffic steering policy information based on the traffic steering identifier specifically includes: locally obtaining the traffic steering policy information based on the traffic steering identifier; or obtaining the traffic steering policy information from a capability exposure network element based on the traffic steering identifier. In a possible implementation method, that the communications unit 1301 is configured to obtain the traffic steering policy information specifically includes: obtaining the traffic steering policy information from a policy control network element.

If the apparatus 1300 is a policy control network element or a session management network element, the policy control network element or the session management network element is presented in a form of function modules obtained through division in an integrated manner. The "module" herein may be a specific ASIC, a circuit, a processor executing one or more software or firmware programs, a memory, an integrated logic circuit, and/or another component that can provide the foregoing function. In a simple embodiment, a person skilled in the art may figure out that the policy control network element or the session management network element may be in a form shown in FIG. 12.

For example, the processor 1202 in FIG. 12 may invoke the computer-executable instructions stored in the memory 1201, to enable the policy control network element or the session management network element to perform the method in the foregoing method embodiments.

Specifically, functions/implementation processes of the communication unit 1301 and the processing unit 1302 in FIG. 13 may be implemented by the processor 1202 in FIG. 12 by invoking the computer-executable instructions stored in the memory 1201. Alternatively, functions/implementation processes of the processing unit 1302 in FIG. 13 may be implemented by the processor 1202 in FIG. 12 by invoking the computer-executable instructions stored in the memory 1201, and functions/implementation processes of the communication unit 1301 in FIG. 13 may be implemented by the communication interface 1203 in FIG. 12.

Optionally, when the apparatus 1200 is a chip or a circuit, functions/implementation processes of the communication unit 1301 may alternatively be implemented through a pin, a circuit, or the like.

A person of ordinary skill in the art may understand that various numerals such as "first" and "second" in this application are merely used for differentiation for ease of description, and are not used to limit the scope of the embodiments of this application or represent a sequence. The term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. "At least one" means one or more. At least two means two or more. "At least one", "any one", or a similar expression means any combination of these items, including a single item (piece) or any combination of a plurality of items (pieces). For example, at least one (piece, or type) of a, b, or c may represent: a, b, c, a and b, a and c, b and c, or a, b, and c, where a, b, and c may be singular or plural. The term "a plurality of" means two or more, and another quantifier is similar to this. In addition, elements in a singular form: "a", "an", and "the", do not mean "one or only one" but "one or more" unless otherwise expressly specified in the context. For example, "a device" means one or more such devices.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and the microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be disposed in the ASIC.

These computer program instructions may alternatively be loaded onto a computer or another programmable data processing device, so that a series of operation steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:
   receiving, by a policy control network element executed by a processor, first information and location information corresponding to a location of a deployment of a service, wherein the first information is a traffic steering requirement, and the traffic steering requirement indicates at least one service function to be passed through by the service;
   sending, by the policy control network element, the traffic steering requirement and the location information to a first network element;
   receiving, by the policy control network element from the first network element, first traffic steering policy information corresponding to the location information and the traffic steering requirement; and
   sending, by the policy control network element, the first traffic steering policy information or a traffic steering identifier corresponding to the first traffic steering policy information to a session management network element,
   wherein the first traffic steering policy information indicates network elements corresponding to the at least one service function and a sequence in which service data passes through the network elements corresponding to the at least one service function.

2. The method according to claim 1, wherein the method further comprises:
   generating, by the session management network element, a forwarding rule based on the first traffic steering policy information;
   determining, by the session management network element, a user plane network element based on the location information corresponding to the first traffic steering policy information; and
   sending, by the session management network element, the forwarding rule to the user plane network element.

3. The method according to claim 1, wherein the method further comprises:
   determining, by the policy control network element, third traffic steering policy information based on the first information, the first traffic steering policy information, and the location information corresponding to the service, wherein the third traffic steering policy information comprises location information corresponding to the third traffic steering policy information; and
   sending, by the policy control network element, the third traffic steering policy information or a traffic steering identifier corresponding to the third traffic steering policy information to the session management network element.

4. The method according to claim 1, wherein the location information corresponding to the location of the deployment of the service is location information of a terminal device that accesses the service.

5. The method according to claim 1, further comprising:
   sending, by the first network element, the first traffic steering policy information to the policy control network element.

6. A communication apparatus, comprising:
   a processor; and
   a memory having instructions stored thereon that, when executed by the processor, cause the communication apparatus to:
   receive first information and location information corresponding to a location of a deployment of a service, wherein the first information is a traffic steering requirement, and the traffic steering requirement indicates at least one service function to be passed through by the service;
   send the traffic steering requirement and the location information to a first network element;
   receive, from the first network element, first traffic steering policy information corresponding to the location information and the traffic steering requirement; and
   send the first traffic steering policy information or a traffic steering identifier corresponding to the first traffic steering policy information to a session management network element,
   wherein the first traffic steering policy information indicates network elements corresponding to the at least one service function and a sequence in which service data passes through the network elements corresponding to the at least one service function.

7. The communication apparatus according to claim 6, wherein the communication apparatus is further caused to:
   determine third traffic steering policy information based on the first information, the first traffic steering policy information, and the location information corresponding to the service, wherein the third traffic steering policy information comprises location information corresponding to the third traffic steering policy information; and
   send the third traffic steering policy information to the session management network element.

8. The communication apparatus according to claim 6, wherein the location information corresponding to the location of the deployment of the service is location information of a terminal device that accesses the service.

9. A communication system, comprising:
   a policy control network element; and
   a session management network element,
   wherein
   the policy control network element comprises at least one first processor and a first non-transitory computer-readable storage medium which is coupled to the first processor, and the first non-transitory computer-readable storage medium is configured to store first instructions, the at least one first processor being configured to execute the first instructions to cause the policy control network element to:
   receive first information and location information corresponding to a location of a deployment of a service, wherein the first information is a traffic steering requirement, and the traffic steering requirement indicates at least one service function to be passed through by the service;
   send the traffic steering requirement and the location information to a first network element,
   receive, from the first network element, first traffic steering policy information corresponding to the location information and the traffic steering requirement, wherein the first traffic steering policy information indicates network elements corresponding to the at least one service function and a sequence in which service data passes through the network elements corresponding to the at least one service function; and send the first traffic steering policy information or a traffic steering identifier corresponding to the first traffic steering policy information to the session management network element, and wherein the session management network element comprises at least one second processor and a second non-transitory computer-readable storage medium which is coupled to the second processor, and the second non-transitory computer-readable storage medium is configured to store second instructions, the at least one second processor being configured to execute the second instructions to cause the session management network element to:

receive the first traffic steering policy information or the traffic steering identifier corresponding to the first traffic steering policy information from the policy control network element.

10. The communication system according to claim 9, wherein the session management network element is further caused to:

generate a forwarding rule based on the traffic steering policy information;

determine a user plane network element based on the location information corresponding to the first traffic steering policy information; and send the forwarding rule to the user plane network element.

11. The communication system according to claim 9, wherein the policy control network element is further caused to:

determine third traffic steering policy information based on the first information, the first traffic steering policy information, and the location information corresponding to the service, wherein third traffic steering policy information comprises location information corresponding to the third traffic steering policy information; and send the third traffic steering policy information to the session management network element.

12. The communication system according to claim 9, wherein the location information corresponding to the location of the deployment of the service is location information of a terminal device that accesses the service.

13. The communication system according to claim 9, further comprising: the first network element configured to:

send the first traffic steering policy information to the policy control network element.

\* \* \* \* \*